(12) United States Patent
Angelini et al.

(10) Patent No.: US 10,663,651 B2
(45) Date of Patent: May 26, 2020

(54) LIGHT MIXING SYSTEMS WITH A GLASS LIGHT PIPE

(71) Applicant: Fraen Corporation, Reading, MA (US)

(72) Inventors: Marco Angelini, Trivolzio (IT); Claudia Bigliati, Trino (IT); Robert A. Gobron, Southborough, MA (US); Rachel Taranta, Somerville, MA (US); Natale Baraldo, Milan (IT)

(73) Assignee: Fraen Corporation, Reading, MA (US)

( * ) Notice: Subject to any disclaimer, the term of this patent is extended or adjusted under 35 U.S.C. 154(b) by 0 days.

(21) Appl. No.: 16/246,127

(22) Filed: Jan. 11, 2019

(65) Prior Publication Data

US 2019/0146148 A1 May 16, 2019

Related U.S. Application Data

(63) Continuation of application No. 16/156,620, filed on Oct. 10, 2018, now Pat. No. 10,254,474, which is a
(Continued)

(51) Int. Cl.
| | | |
|---|---|---|
| *F21V 8/00* | (2006.01) | |
| *G02B 6/26* | (2006.01) | |
| *G02B 27/09* | (2006.01) | |

(52) U.S. Cl.
CPC ......... *G02B 6/0096* (2013.01); *G02B 6/0008* (2013.01); *G02B 6/262* (2013.01); *G02B 27/0955* (2013.01); *G02B 27/0994* (2013.01)

(58) Field of Classification Search
USPC ....... 362/55; 353/53; 356/326; 359/501, 496
See application file for complete search history.

(56) References Cited

U.S. PATENT DOCUMENTS

| | | |
|---|---|---|
| 3,784,277 A | 1/1974 | Baker |
| 5,271,077 A | 12/1993 | Brockman et al. |
| (Continued) | | |

FOREIGN PATENT DOCUMENTS

| | | |
|---|---|---|
| CN | 1624578 A | 6/2005 |
| CN | 1979251 A | 6/2007 |
| (Continued) | | |

OTHER PUBLICATIONS

PCT International Preliminary Report on Patentability and Written Opinion for PCT/EP2012/077043 dated Jul. 10, 2014 (19 sheets).
(Continued)

*Primary Examiner* — Allyson N Trail
(74) *Attorney, Agent, or Firm* — Nelson Mullins Riley & Scarborough LLP; Thomas J. Engellenner; Reza Mollaaghababa

(57) ABSTRACT

An optical system is disclosed, which comprises a glass light pipe having an input surface for receiving light from a light source and an output surface through which light exits the light pipe, and a polymeric light pipe optically coupled at its input surface to the output surface of the glass light pipe to receive at least a portion of the light exiting the glass light pipe, said polymeric light pipe having a textured output surface. A plurality of microlenses is optically coupled to said textured surface of the polymeric light pipe, and a projection lens is optically coupled to the output surface of the polymeric light pipe to receive light therefrom.

10 Claims, 25 Drawing Sheets

Related U.S. Application Data continuation of application No. 15/976,314, filed on May 10, 2018, now Pat. No. 10,151,872, which is a continuation of application No. 15/185,627, filed on Jun. 17, 2016, now Pat. No. 9,995,872, application No. 16/246,127, which is a continuation-in-part of application No. 13/729,459, filed on Dec. 28, 2012, now Pat. No. 9,411,083.

(60) Provisional application No. 62/181,181, filed on Jun. 17, 2015, provisional application No. 61/582,083, filed on Dec. 30, 2011.

(56) References Cited

U.S. PATENT DOCUMENTS

| | | | |
|---|---|---|---|
| 5,550,716 | A | 8/1996 | Dassanayake et al. |
| 6,056,426 | A | 5/2000 | Jenkins |
| 6,200,002 | B1 | 3/2001 | Marshall et al. |
| 6,219,480 | B1 | 4/2001 | Cassarly et al. |
| 6,341,876 | B1 | 1/2002 | Moss et al. |
| 6,547,416 | B2 | 4/2003 | Pashley et al. |
| 6,575,580 | B2 | 6/2003 | Okamori et al. |
| 6,614,972 | B1 | 9/2003 | Lundin |
| 6,819,505 | B1 | 11/2004 | Cassarly et al. |
| 6,995,355 | B2 | 2/2006 | Rains, Jr. et al. |
| 7,145,125 | B2 | 12/2006 | May et al. |
| 7,349,163 | B2 | 3/2008 | Angelini et al. |
| 7,581,862 | B2 | 9/2009 | Stefanov et al. |
| 7,907,345 | B2 | 3/2011 | Paulussen et al. |
| 8,246,210 | B2 | 8/2012 | Angelini et al. |
| 8,482,226 | B2 | 7/2013 | Vinther et al. |
| 9,243,760 | B2 | 1/2016 | Lillelund et al. |
| 9,411,083 | B2 | 8/2016 | Angelini et al. |
| 9,772,499 | B2 | 9/2017 | Angelini et al. |
| 9,995,872 | B2 | 6/2018 | Angelini et al. |
| 10,151,872 | B2 | 12/2018 | Angelini et al. |
| 10,254,474 | B2 | 4/2019 | Angelini et al. |
| 2002/0135869 | A1 | 9/2002 | Banish et al. |
| 2005/0036203 | A1 | 2/2005 | Ferri |
| 2005/0168987 | A1 | 8/2005 | Tamaoki et al. |
| 2005/0286123 | A1 | 12/2005 | Abu-Ageel |
| 2006/0018031 | A1 | 1/2006 | Takasugi |
| 2006/0039160 | A1 | 2/2006 | Cassarly et al. |
| 2006/0044523 | A1 | 3/2006 | Teijido |
| 2006/0153518 | A1 | 7/2006 | Abu-Ageel |
| 2006/0291206 | A1 | 12/2006 | Angelini et al. |
| 2007/0024971 | A1 | 2/2007 | Cassarly et al. |
| 2007/0126994 | A1 | 6/2007 | Hwang |
| 2008/0030974 | A1 | 2/2008 | Abu-Ageel |
| 2008/0068852 | A1 | 3/2008 | Goihl |
| 2008/0239717 | A1 | 10/2008 | Chen et al. |
| 2009/0034278 | A1 | 2/2009 | Tessnow et al. |
| 2009/0109698 | A1 | 4/2009 | Koyata et al. |
| 2009/0185392 | A1 | 7/2009 | Krupa |
| 2010/0188018 | A1 | 7/2010 | Salm |
| 2010/0226127 | A1 | 9/2010 | Bigliatti et al. |
| 2011/0109445 | A1 | 5/2011 | Weaver |
| 2011/0267823 | A1 | 11/2011 | Angelini et al. |
| 2012/0127710 | A1 | 5/2012 | Jurik et al. |
| 2013/0039090 | A1 | 2/2013 | Dau et al. |
| 2013/0155723 | A1 | 6/2013 | Coleman |
| 2013/0258699 | A1 | 10/2013 | Weaver |
| 2013/0294045 | A1 | 11/2013 | Morgenbrod |
| 2013/0301291 | A1 | 11/2013 | Lavizzari |
| 2014/0340927 | A1 | 11/2014 | Johnston et al. |
| 2016/0370529 | A1 | 12/2016 | Angelini et al. |
| 2016/0370533 | A1 | 12/2016 | York et al. |
| 2017/0142314 | A1 | 5/2017 | Moore |
| 2017/0299955 | A1 | 10/2017 | Kawamura et al. |
| 2017/0307805 | A1 | 10/2017 | Wong |
| 2017/0351101 | A1 | 12/2017 | Angelini et al. |
| 2019/0033511 | A1 | 1/2019 | Gobron et al. |
| 2019/0278018 | A1 | 9/2019 | Angelini et al. |

FOREIGN PATENT DOCUMENTS

| | | |
|---|---|---|
| EP | 1398659 A2 | 3/2004 |
| EP | 2211089 A1 | 7/2010 |
| EP | 2211090 A1 | 7/2010 |
| JP | 2004184612 A | 7/2004 |
| JP | 2007012530 A | 1/2007 |
| WO | 2004032250 A1 | 4/2004 |
| WO | 2010091097 A1 | 8/2010 |
| WO | 2010113100 A1 | 10/2010 |
| WO | 2013098387 A2 | 7/2013 |
| WO | 2013149139 A1 | 10/2013 |

OTHER PUBLICATIONS

International Search Report for WO 2013/098387, dated Aug. 9, 2013.
Japanese Office with English Translation for corresponding Japanese Application 2014-549484 dated May 12, 2015.
Application Brief 1-003. Light Guide Technologies; Using LED Lamps. Avago Technologies. Dec. 11, 2006: 22 pages.
Japanese Office Action for corresponding Japanese Application No. 2014-549484 dated Oct. 13, 2015.
Invitation to Pay Additional Fees and Where Applicable, Protest Fee for PCT/US2016/038070, dated Sep. 20, 2016; 7 pages.
TechSPec(TM) Light Pipes Homogenize Non-Uniform Light Sources. Marketing Edmund Optics, Inc. Press Release dated: Jun. 28, 2007; 1 page.
The International Search Report for WO/2013/098387, dated Aug. 9, 2013; 8 pages.
International Preliminary Report on Patentability received in PCT/US2016/038070 dated Dec. 28, 2017; 13 pages.
Chinese Office Action for corresponding Chinese Application No. 201280064730.7, dated Dec. 2, 2016; 19 pages.
The International Search Report for PCT/US2016/038070, dated Nov. 16, 2016; 6 pages.
The International Written Opinion for PCT/US2016/038070, dated Nov. 16, 2016; 11 pages.
Extended European Search Report and European Search Opinion dated Nov. 22, 2019 from corresponding EP Application No. 19182884.7, 10 pages.
Anonymous: "TechSpec(TM) Light Pipes Homogenize Non-Uniform Light Sources", Jul. 10, 2007 (Jul. 10, 2007), XP055263462, Retrieved from the Internet: URL:http://news.thomasnet.com/fullstory/light-pipes-homogenize-nonuniform-light-sources-523659,[retrieved on Apr. 6, 2016], 4 pages.
European Examination Report dated Apr. 8, 2019 from EP Application No. 16750277.2, 4 pages.
European Examination Report in corresponding European Application, EP12816673.3 dated Apr. 15, 2016, 7 pages.
European Search Report and Search Opinion dated Feb. 14, 2018 from corresponding European Application No. EP17198505.4, 5 pages.
European Search Report and Search Opinion dated Feb. 19, 2018 from corresponding European Application No. EP17198516.1, 9 pages.
European Search Report and Search Opinion dated Sep. 18, 2019 from corresponding European Application No. EP19192567.6, 10 pages.
Extended European Search Report and European Search Opinion dated May 3, 2019 from corresponding EP Application No. 19157504.2, 8 pages.
Extended European Search Report and European Search Opinion dated Nov. 22, 2018 from corresponding EP Application No. 18194921.5, 9 pages.
International Preliminary Report on Patentability from PCT/US2016/038070 dated Dec. 19, 2017; 12 pages.
International Search Report/Written Opinion for PCT/US2018/042058 dated Dec. 10, 2018, 12 pages.
Renaissance Lighting Introduces evo(TM) Solid State Product Line With Ed Series, Industry's First LED Downlight, http://www.ledsmagazine.com/ugc/2006/05/renaissance-unvells-evo-solid-State-product-line.hlml, (May 9, 2006), pp. 3.

(56) References Cited

OTHER PUBLICATIONS

Third Party Observation submitted in corresponding European Application, EP12816673.3, dated Oct. 27, 2017, 6 pages.
Third Party Observation submitted in corresponding European Application, EP12816673.3, dated Jan. 27, 2016, 5 pages.
U.S. Appl. No. 15/185,627, filed Jun. 17, 2016, Marco Angelini et al.
U.S. Appl. No. 15/976,314, filed May 10, 2018, Marco Angelini et al.
U.S. Appl. No. 16/156,620, filed Oct. 10, 2018, Marco Angelini et al.
U.S. Appl. No. 16/425,158, filed May 29, 2019, Marco Angelini et al.
U.S. Appl. No. 16/035,339, filed Jul. 13, 2018, Gobron, Robert A.
U.S. Appl. No. 13/729,459, filed Dec. 28, 2012, Marco Angelini et al.
U.S. Appl. No. 15/200,843, filed Jul. 1, 2016, Marco Angelini et al.
U.S. Appl. No. 16/021,942, filed Jun. 28, 2018, Carlton S. Jones.

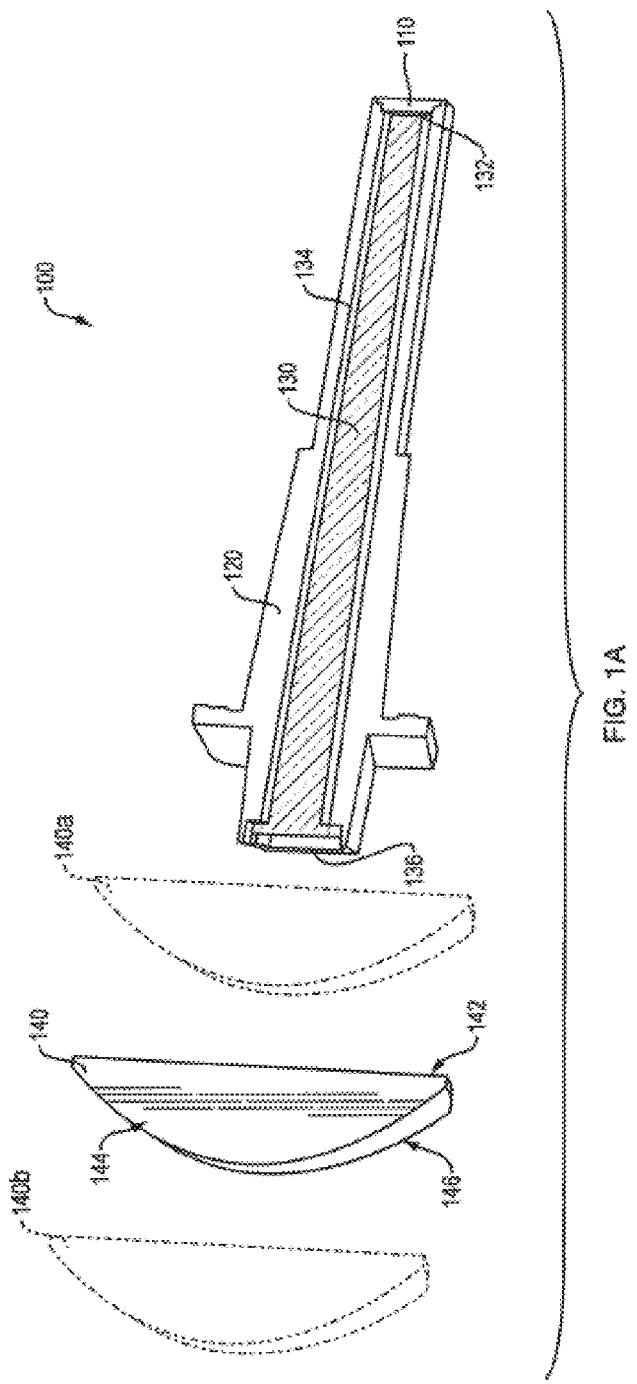

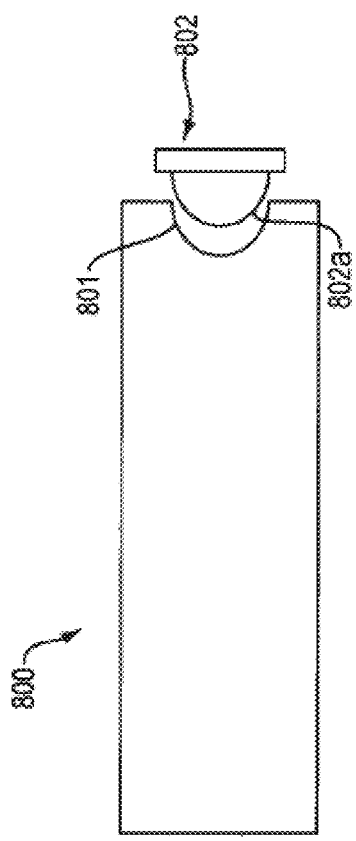

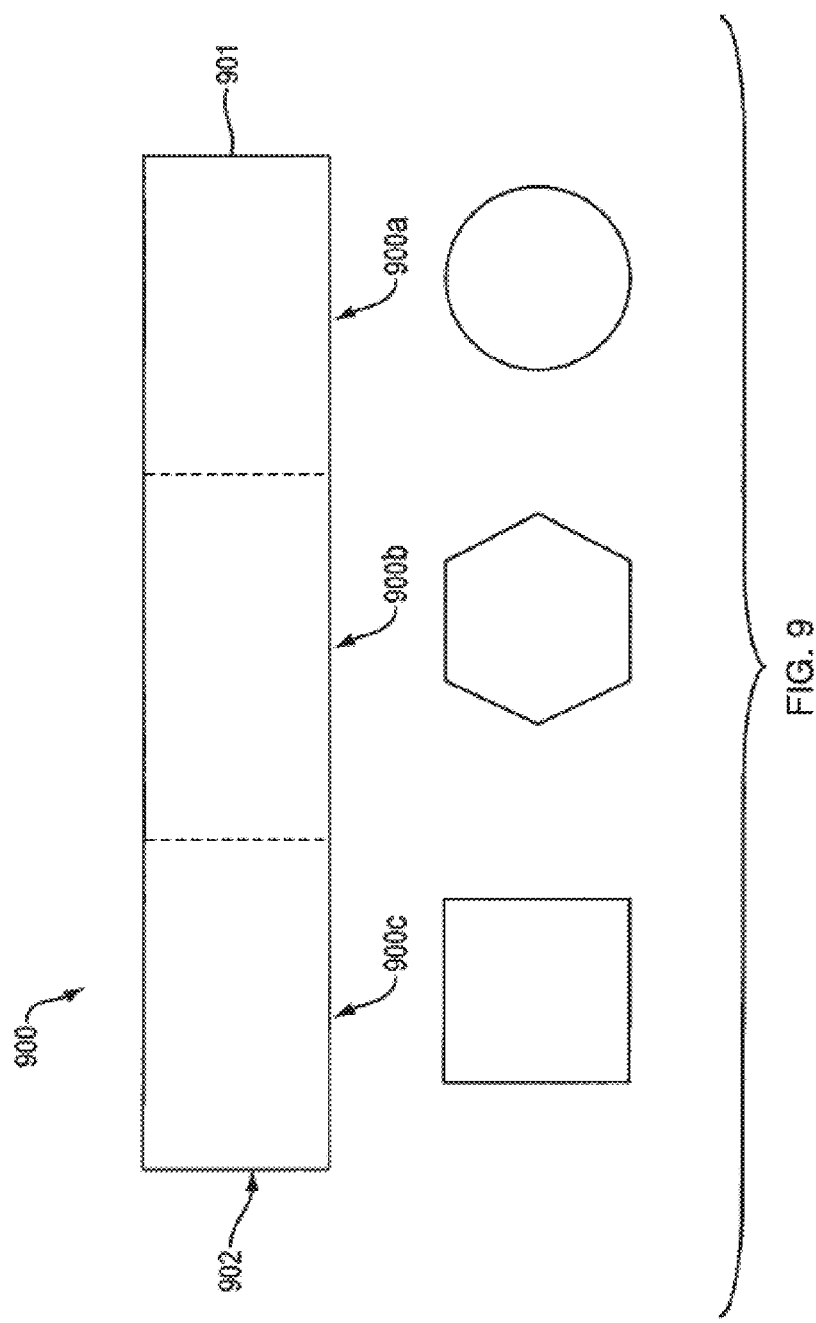

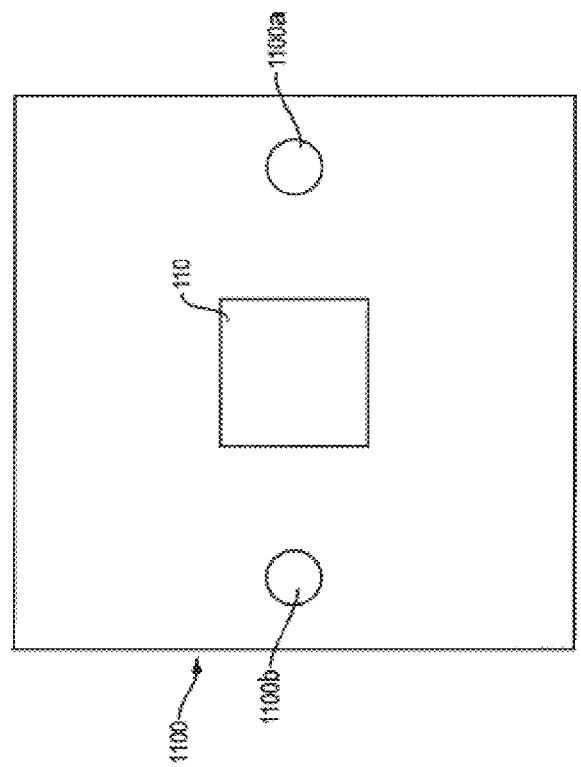

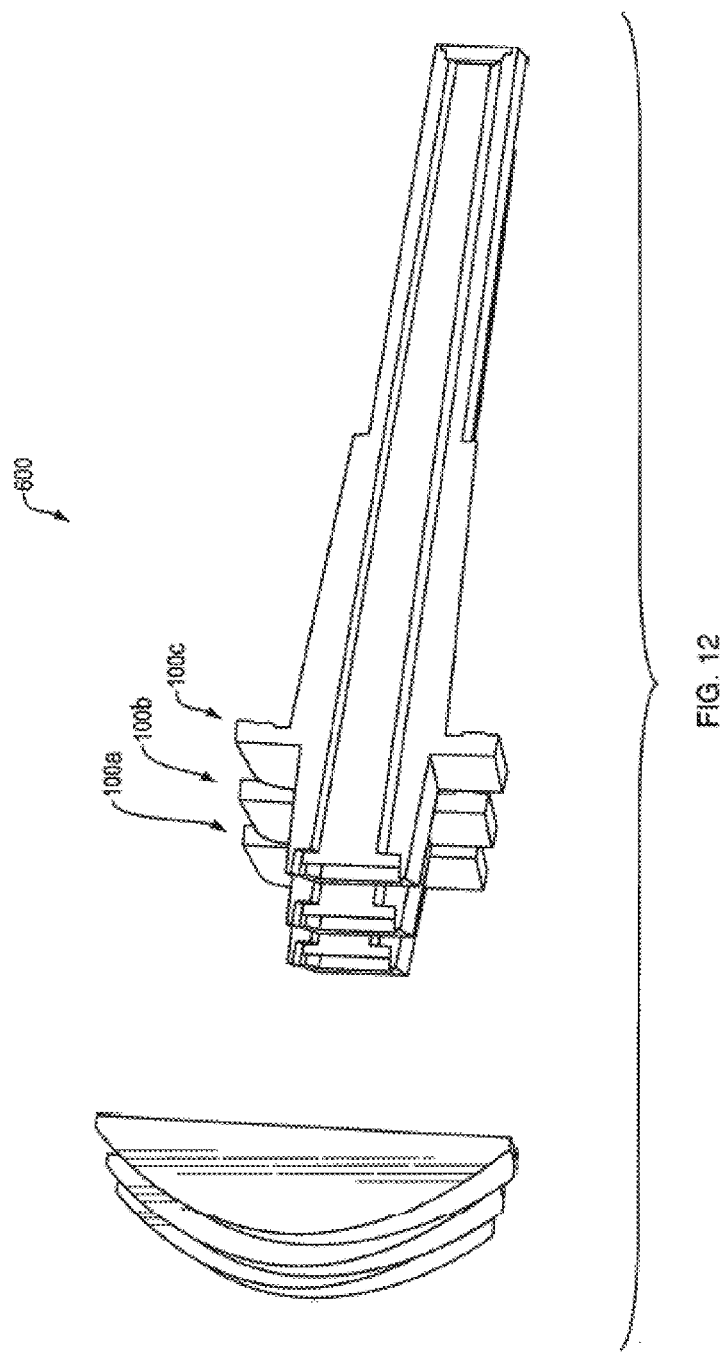

LIGHT MIXING SYSTEMS WITH A GLASS LIGHT PIPE

RELATED APPLICATIONS

This application is a Continuation Application of Ser. No. 16/156,620, filed Oct. 10, 2018, which is a Continuation Application of Ser. No. 15/976,314, filed May 10, 2018, now U.S. Pat. No. 10,151,872, issued Dec. 11, 2018, which is a Continuation Application of Ser. No. 15/185,627, filed Jun. 17, 2016, now U.S. Pat. No. 9,995,872, issued Jun. 12, 2018, which claims priority to Provisional Application No. 62/181,181, filed on Jun. 17, 2015, and which also claims priority as a Continuation-in-Part to application Ser. No. 13/729,459, filed on Dec. 28, 2012, now U.S. Pat. No. 9,411,083, issued Aug. 9, 2016, which in turn claims priority to Provisional Application No. 61/582,083 filed on Dec. 30, 2011. All of these applications are herein incorporated by reference in their entirety.

FIELD

The present patent application generally relates to lenses and lighting systems, and more particularly to lenses and lighting systems for light mixing and/or color mixing.

INTRODUCTION

Lenses and lighting systems for high-power light sources, such as light emitting diodes, can have a wide variety of configurations. In many cases, a particular configuration can be characterized by the illumination pattern it produces, by the coherence, intensity, efficiency and uniformity of the light projected by it, and so on. The application for which the lens and/or lighting system is designed may demand a high level of performance in many of these areas.

Many applications call for the ability to mix light from multiple sources, e.g., sources producing light of different colors. Further, light mixing is also useful for systems with large light sources. In both cases, it is difficult to produce uniformly mixed light and reduce source imaging. To date, light-mixing systems have typically provided textured surfaces to spread the light from a light source. The efficiency and capabilities of such systems are limited and their illumination characteristics are typically sub-par.

Accordingly, there is a need for improved light-mixing lenses and lighting systems.

SUMMARY

In one aspect, an optical system is disclosed that includes a glass light pipe having an input surface for receiving light from a light source and a polymeric light-shaping element having an input surface that is optically coupled to the output surface of the glass light pipe to receive at least a portion of the light exiting the glass light pipe and having an output surface through which the light exits the light-shaping element. The light-shaping element includes a plurality of microlenses on any of its input and/or output surface. In some embodiments, the microlenses can be hemispherical with a size characterized by a diameter in a horizontal cross section in a range of about 0.05 mm to about 1 mm and a radius (i.e., the size of the arc of the hemisphere in a vertical cross section) in a range of about 0.5 mm to about 5 mm. A projection lens is optically coupled to the output surface of the polymeric light-shaping element to receive light thereform. In some embodiments, at least one of the microlenses, and in many embodiments all of the microlenses, can have a textured surface. In some cases, the textured surface can include a plurality of surface undulations characterized by heights in a range of about 0.01 mm to about 0.25 mm, e.g., in a range of about 0.05 mm to about 0.1 mm. In some embodiments, the light-shaping element can have a thickness in a range of about 0.5 mm to about 3 mm. In some embodiments, the glass light pipe is tapered such that its input surface has a smaller surface area than its output surface. By way of example, the taped light pipe can have a draft angle equal to or less than about 20 degrees. A variety of light sources can be used with the optical system. By of example, the light source can be a single light emitting diode (LED) or multiple LEDs, e.g., LEDs generating different colors.

In one aspect, an optical system is disclosed, which comprises a glass light pipe having an input surface for receiving light from a light source and an output surface through which light exits the light pipe, and a polymeric light pipe optically coupled at its input surface to the output surface of the glass light pipe to receive at least a portion of the light exiting the glass light pipe, said polymeric light pipe having a textured output surface. A plurality of microlenses is optically coupled to said textured surface of the polymeric light pipe, and a projection lens is optically coupled to the output surface of the polymeric light pipe to receive light therefrom.

In some embodiments, the polymeric light pipe is tapered. In some embodiments, the textured surface exhibits undulations with a maximum height in range of about 0.01 mm to about 0.25 mm, e.g., in a range of about 0.05 mm to about 0.1 mm.

In accordance with one aspect, an optical device is provided that includes a light pipe having a proximal end adapted for optical coupling to a light source, e.g., a light emitting diode (LED), to receive a plurality of light rays therefrom and a distal end providing an output surface for the light rays. The light pipe can be configured to cause mixing of the light rays via reflection at one or more lateral surfaces thereof as the light rays pass through the light pipe. The optical device can include a lens optically coupled to the output surface to receive light therefrom. In various aspects, the output surface can comprise one or more surface features configured to modulate the light passing therethrough. For example, the output surface can include a texture. In some aspects, the surface features can comprise a plurality of microlenses such that light rays exiting the light pipe exit through the microlenses.

In some embodiments, the light source can include a plurality of light emitting sources generating light at different colors. For example, the light source can be two LEDs providing light at different colors In some embodiments, the lens can be a zoom lens that can move axially relative to an output surface of the light pipe to change, e.g., the angular spread of the beam. In some embodiments, rather than utilizing a single zoom lens, a zoom lens system comprising two or more lenses, at least one of which is axially movable relative to the output surface of the light pipe, is employed to change the divergence of the output beam, e.g., between a narrow-beam spread and a wide-beam spread. For example, the zoom lens system can include a lens providing a positive optical power and another providing a negative optical power. In some embodiments, a multi-lens zoom system can provide, in the wide-beam position, an output beam exhibiting a divergence (e.g., as characterized by full width at half maximum (FWHM) of the light intensity distribution in a plane perpendicular to the direction of propagation) in a range of about 20 degrees to about 80 degrees.

In some embodiments, the lateral surface(s) of the light pipe can be configured to cause total internal reflection of at least some of the light rays incident thereon. In other embodiments, the lateral surface(s) of the light pipe can be metallized to cause specular reflection of light rays incident thereon.

In various embodiments, the light pipe comprises an input surface at the proximal end for receiving said light rays from the light source. In some aspects, the output surface has a greater cross-sectional area than said input surface. In one aspect, the light pipe has a longitudinal dimension that is at least 10 times greater than any linear dimension of said input surface. In various aspects, the light pipe can have a parallelepiped shape characterized by said input surface, said output surface, and four lateral surfaces. In a related aspect, any two opposed lateral surfaces of the light pipe diverge in a direction from said proximal end to said distal end. A draft angle associated with the divergence of the opposed lateral surfaces can be in a range of about 0 degree to about 20 degrees.

In some embodiments, the light pipe includes at least two portions having different cross-sectional shapes. For example, the light pipe can include a proximal portion (a portion proximate to the light source) having one cross-sectional shape (e.g., circular), an intermediate portion having a different cross-sectional shape (e.g., hexagonal) and a distal portion having yet another cross-sectional shape (e.g., square).

In some embodiments, the shape of the output surface of the light pipe is selected to impart a desired cross-sectional shape to the light beam exiting the light pipe. For example, in some embodiments, the output surface of the light pipe can have a generally square shape with rounded corners. In other embodiments, the output surface of the light pipe can have a hexagonal or an octagonal shape. In some embodiments, the shape of the input surface of the light pipe is different that the shape of its output surface. For example, the light pipe can include a square input surface and a hexagonal output surface.

In some embodiments, the optical system can include a light interface unit coupled to the proximal end of the light pipe for facilitating the delivery of light from a light source to the light pipe. In some cases, the light interface unit can also provide some mixing of light. In some implementations, the light interface unit is integrally formed with the remainder of the light pipe, e.g., the light interface unit can form the proximal portion of the light pipe. In some embodiments, the light interface unit can include a cavity, which can be formed by a curved input surface, for receiving light from a light source. The input surface receives the light and couples the light, e.g., via refraction, into the light interface unit. In some embodiments, the input surface is configured such that a substantial portion of the received light is redirected toward a peripheral surface of the light interface unit. The peripheral surface can in turn reflect the light incident thereon, e.g., via total internal reflection or specular reflection, to the light pipe (or in cases in which the light interface unit is formed integrally with the light pipe to the remainder of the light pipe).

In some embodiments, the light interface unit and the light pipe can be formed as separate pieces that are optically coupled to one another, e.g., via an adhesive and/or mechanical couplings.

In some embodiments, the light pipe can include an input surface that is shaped to conform to the shape of an output surface of a light source that is optically coupled thereto. For example, the light pipe can include a concave input surface that conforms to a convex surface of a dome of an LED.

In some embodiments of the optical system, a baffle is coupled to the lens. For example, a baffle can be coupled to a zoom lens utilized in the optical system so as to capture certain light rays, e.g., those rays exiting the light pipe that fail to strike the zoom lens when the zoom lens is moved away from the output surface of the light pipe to be at its distal location.

In some embodiments, the light pipe can be formed of polymethyl methacrylate (PMMA), polymethacrylmethylimid (PMMI), glass, polycarbonate, cyclic olefin copolymer, cyclic olefin polymer, silicone, or other suitable materials.

In some aspects, the optical device can include a holder providing a housing for the light pipe. In some embodiments, the holder can include a plurality of legs for coupling to openings in a substrate, e.g., a printed circuit board (PCB), on which a light source is mounted.

In a related aspect, an optical device is disclosed, which comprises a light pipe having a proximal end adapted for coupling to a light source to receive light therefrom and a distal end through which light exits the light pipe, said light pipe being configured to cause mixing of the light via reflection at one or more lateral surfaces thereof as the light propagates from its proximal end to its distal end. A lens, e.g., a zoom lens, is optically coupled to the distal end of the light pipe to receive at least a portion of the light exiting the light pipe, said lens being configured to project the received light as an output beam. The lens comprises at least one surface exhibiting a plurality of surface modulations for modulating (adjusting) at least one characteristic of the output beam. For example, the surface modulations can adjust a maximum divergence angle of the beam and/or the beam's cross-sectional shape. In some embodiments, the surface modulations can include at least two different types of modulations disposed on at least two different portions of the lens surface. For example, the different surface modulations can include sinusoidal modulations at two different frequencies. In some implementations, the two types of surface modulations are employed to impart different maximum divergence angles to the light exiting through different portions of the lens surface.

In some embodiments, the profile of the lens surface having surface modulations can be characterized as a combination of a base profile and a modulation profile, each of which can in turn be characterized by a mathematical function exhibiting a continuous first derivative.

In a related aspect, an optical system is disclosed that comprises a plurality of light modules disposed adjacent to one another, each of said light modules comprising: a light pipe for receiving light from a light source at a distal end thereof and guiding the received light at least partially via reflections at its one or more peripheral surfaces to a distal end thereof through which light exits the light pipe, and a lens for receiving at least a portion of the light exiting the light pipe to form an output beam. The light modules are positioned and oriented relative to one another such that the output beam of each module at least partially overlaps with the output beam of at least another module on a target surface so as to provide collectively a desired illumination pattern on that surface. For example, the output beam of each module can at least partially overlap with an output beam of at least another module at one or more spatial locations.

In another aspect, an optical system is disclosed, which includes a glass light pipe extending from an input surface for receiving light from a light source to an output surface through which light exits the light pipe. A projection lens is optically coupled to the output surface of the light pipe to receive light therefrom. In some embodiments, a plurality of microlenses are coupled to the output surface of the light pipe, where each microlens provides a curved surface through light exits the microlens. Further, at least one of the microlenses can include textures on its curved surface characterized by a height in a range of about 0.01 mm to about 0.25 mm. While in some embodiments, the microlenses are formed integrally with the light pipe, in other embodiments, the microlenses are formed on a surface of a separate light-shaping element that is optically coupled to the output surface of the light pipe. In some embodiments, such a separate light-shaping element can have a thickness in a range of about 0.5 to about 3 mm. In some embodiments, the glass light pipe is tapered such that the input surface thereof has a smaller surface area than that of its output surface. By way of example, the tapered glass light has a draft angle equal to or less than about 20 degrees. In some embodiments, the glass light pipe has a polygonal cross section, such as a square, a rectangular, a hexagonal and an octagonal cross section.

In some embodiments of the above optical system, at least two of said light modules include light pipes having different cross-sectional shapes.

BRIEF DESCRIPTION OF THE DRAWINGS

The skilled person in the art will understand that the drawings, described below, are for illustration purposes only. The drawings are not intended to limit the scope of the applicant's teachings in any way. Like numerals are utilized to designate similar features of various embodiments.

FIG. 1A depicts a partial cross-sectional view of an exemplary lighting module in accord with various aspects of the applicant's teachings.

FIG. 8 schematically depicts a light pipe according to an embodiment of the invention having a concave input surface for receiving light from a light source.

FIG. 9 schematically depicts a light pipe according to an embodiment of the invention in which different portions exhibit different cross-sectional shapes.

FIG. 10C schematically depicts a PCB on which a light source is mounted, where the PCB includes two openings for receiving the tips of the legs of the holder of the optical system shown in FIGS. 10A and 10B.

FIG. 12 depicts in detail an exemplary lighting system incorporating multiple exemplary lighting modules of FIG. 1A.

DETAILED DESCRIPTION

Figure 1B:
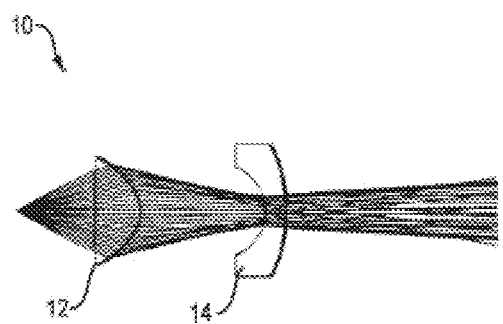
FIG. 1B schematically depicts a zoom lens system in an embodiment according to the teachings of the invention in a narrow-beam position, where the zoom lens system includes a positive and a negative lens.

The present application discloses, among other things, lighting modules and lighting systems containing one or more lighting modules, and associated methods, that receive light from one or more light sources for projecting it onto a target surface, e.g., in a uniform, patterned, or other controlled manner. In various embodiments, the lighting modules and lighting systems can be used to mix the light generated by one or more sources. By way of example, the projected light can be homogenized so as to create an output distribution of substantially uniform luminosity. In many cases, two or more light sources can be used to generate light of different wavelengths. In various embodiments, the lighting modules and systems can be effective to mix the light of different colors. Further, in some embodiments, the lighting systems of the invention can be utilized for effective mixing of light generated by spatially separate individual sources of single color that collectively make up a single large source of light.

The devices and methods disclosed herein can be used with a wide variety of light sources, including light-emitting-diodes and incandescent bulbs, or other coherent or non-coherent sources. Such devices and methods can have a wide range of applications, including, for example, in spot lighting, customizable/adjustable lighting systems, household lighting, flashlights, wearable headlamps or other body-mounted lighting, among others.

Throughout this application, the term "e.g." will be used as an abbreviation of the non-limiting term "for example." It should be understood that regardless of whether explicitly stated or not, all characteristics of the lighting modules and lighting systems described herein are by way of example only, and not necessarily requirements. All Figures merely depict exemplary embodiments of lighting modules and/or systems that incorporate various aspects of the applicants' teachings. Further, the features of one embodiment can be combined with those of any other embodiment. The term "about" is used herein to denote a variation of at most 5% of a numerical value.

With reference now to FIG. 1A, one exemplary embodiment of an optical system (herein also referred to as a lighting module) 100 in accord with the applicants' teachings is depicted. As shown in FIG. 1A, the lighting module 100 can include one or more light source(s) 110, a light pipe 130, and a holder 120. Additionally, the lighting module can be associated with a zoom lens 140 that can selectively focus the light exiting the light pipe 130, as discussed in detail below.

Although any number of light sources can be employed in the lighting module 100, FIG. 1A depicts a single light source 110 being associated with the lighting module 100. Though in the exemplary embodiment depicted in FIG. 1A the light source 110 is depicted as a single LED chip having a substantially flat output surface, a person skilled in the art will appreciate that any number of a wide variety of light sources, including flat and domed light-emitting diodes, incandescent bulbs, or other coherent or non-coherent sources can be used with the systems and methods described herein. Such systems and methods can have a wide range of applications, including, for example, in spot lighting, customizable/adjustable lighting systems, household lighting, flashlights, wearable headlamps or other body-mounted lighting, among others. Further, as will be discussed below, one or more light sources can be associated with each of the lighting modules. By way of example, the lighting module 100 can be configured to project the light from two or more light sources 110 emitting light at the same or different wavelengths. As will be otherwise discussed herein, the lighting module 100 can be effective to mix the light of the two or more light sources.

The light pipe 130 can have a variety of configurations but is generally configured to receive the light generated by the light source 110 and output the light towards the target surface. In the exemplary embodiment depicted in FIG. 1A, for example, the light pipe 130 can include a proximal surface 132, a distal surface 136, and one or more lateral surfaces (e.g., sidewalls 134) extending therebetween. Generally speaking, in this embodiment, the proximal surface 132 can receive light from the light source 110 and act as an input surface for coupling the light from the light source 110 into the light pipe 130. In various embodiments, as the light from the light source 110 enters the light pipe 130, the light from the light source 110 can be refracted towards the sidewall(s) 134. The term "refraction" is meant to indicate that the light rays change direction, as can occur, for example, when they travel from one medium (e.g., air outside the light pipe 130) to another (e.g., the material making up the light pipe 130). As one skilled in the art will appreciate, some light generated by the light source 110 can enter the light pipe 130 without refraction, for example, if the light strikes the input surface 132 in a direction normal to the input surface 132.

After entering the light pipe 130, the light can be transmitted therethrough toward the distal surface 136. The light can be transmitted directly through the light pipe 130 from the input surface 132 to the output surface 136 or indirectly via one or more reflections from the sidewall(s) 134. The sidewall(s) 134 can be adapted to reflect light incident thereon via a wide range of mechanisms, for example via total internal reflection or via specular reflection, such as can be achieved by forming a metallic coating thereon. The reflected light can travel to the distal surface 136, through which light can be coupled out of the light pipe 130 (e.g., via refraction).

Though the input surface 132 is shown as a substantially flat surface disposed in a facing relationship with the exemplary LED chip, it should be appreciated that the proximal surface 132 of the light pipe 130 can have a variety of shapes and/or surface profiles for coupling light generated by a source into the light pipe 130. For example, the surface can be shaped so as to avoid or reduce the passage of light through the light pipe 130 without at least one reflection from the sidewalls 134 and/or to avoid or reduce imaging the light source 110 in the projected light. In some embodiments, for example, the proximal input surface can be configured to receive a light source. By way of example, the input surface 132 can be substantially concave so as to define a cavity in which a light source can be disposed.

Figure 4:
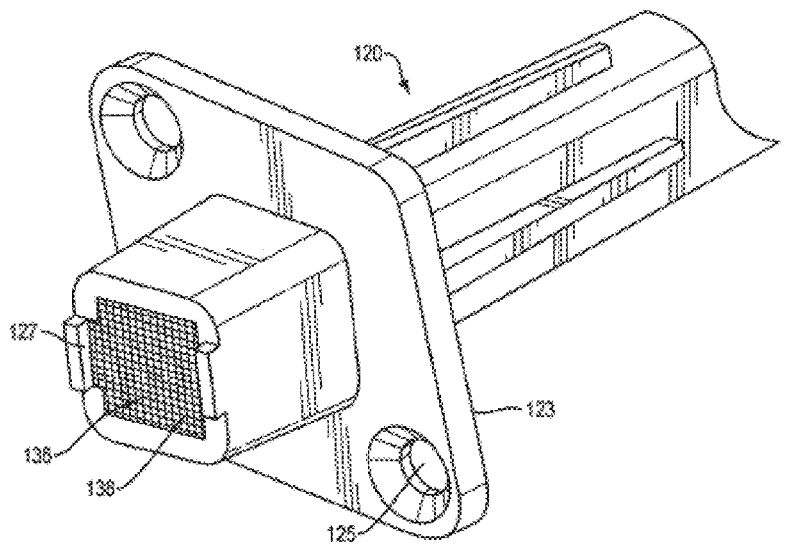
FIG. 4 depicts in detail a distal end of the exemplary lighting module of FIG. 1A.

As will be appreciated by a person skilled in the art, the output surface 136 of the light pipe 130 can also have a variety of configurations. As shown in FIG. 4, for example, the distal surface 136 can comprise surface features (e.g., texturing) formed thereon configure to further spread and or mix the light incident thereon in order to alter the output beam characteristics. For example, in the depicted exemplary embodiment, the distal surface can include an array of microlenses 138, each of which can be effective to focus, diverge, or diffract light incident thereon out of the light pipe 130. In various embodiments, the array of microlenses 138 can be effective to alter the distribution of light relative to a substantially flat output surface, for example, without substantially increasing the maximum divergence of light out of the light pipe 130.

The microlenses 138 can have a variety of shapes and/or sizes. For example, each microlens 138 can be dimensioned such that it is at least about 10 times smaller than the surface area of the output surface 136. As will be appreciated by a person skilled in the art, other structures for spreading or mixing the light at the distal surface 136 can also be employed as part of or in place of the array of microlenses 138. By way of example, surface texturing (e.g., texturing created in the die-mold or using chemical or mechanical etching or roughening) can be used on the distal surface 136 as dictated by the desired output pattern and/or characteristics.

Figure 2:
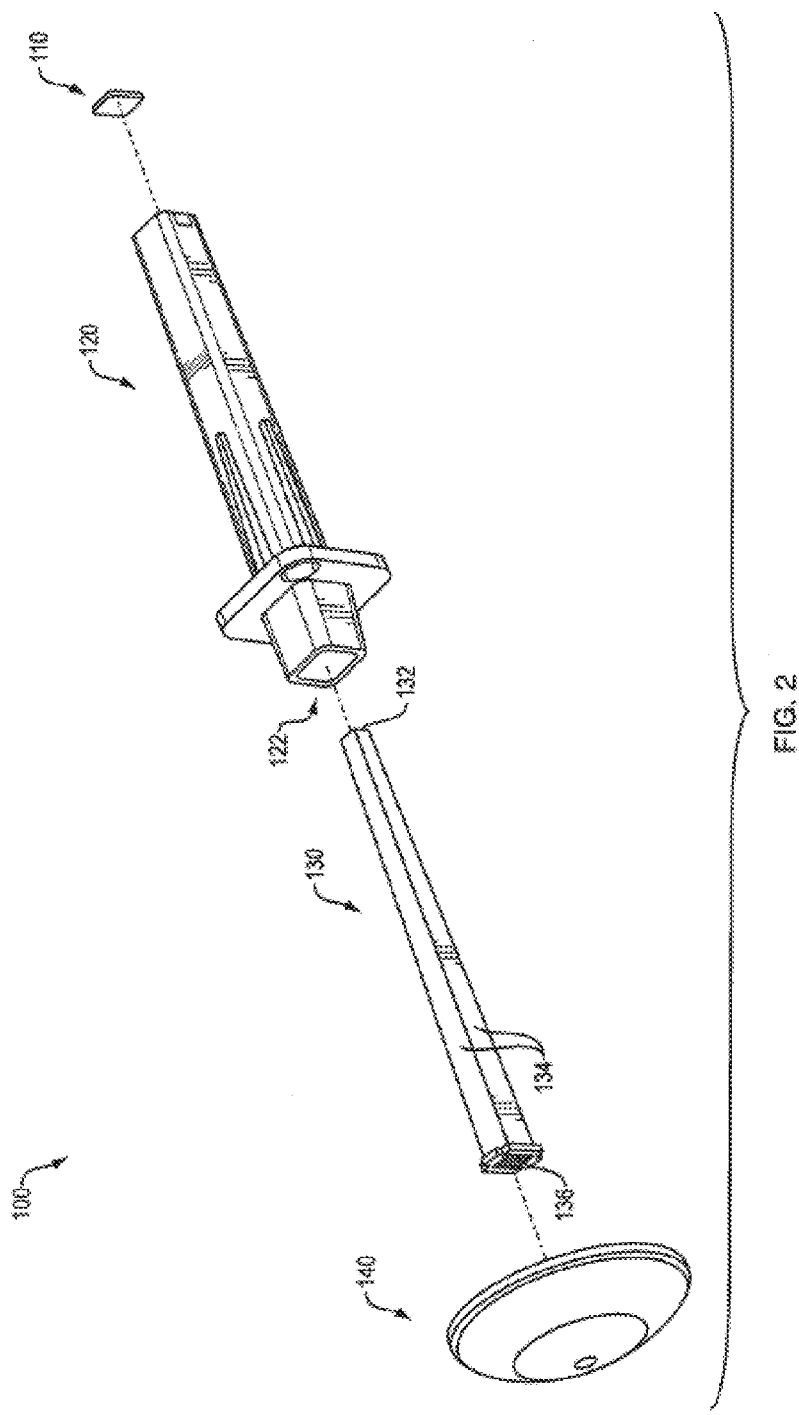
FIG. 2 depicts an exploded view of the exemplary lighting module of FIG. 1A.

The size and the shape of the light pipe can also vary and can be selected so as to optimize the mixing of light. As best shown in FIG. 2, an exemplary light pipe 130 can be a substantially elongate member, for example, having a length that is substantially greater than its width. By way of example, the length of the light pipe 130 can be at least 10 times the width of the proximal surface.

The light pipe 130 can additionally have any number of sidewalls and can have a variety of cross-sectional shapes. By way of non-limiting example, the cross-section of the light pipe 130 can be square, circular, elliptical, hexagonal, octagonal, star-shaped, etc. In various embodiments, the shape and/or number of the sidewalls can be selected based at least in part, for example, on the input surface 132 of the light pipe 130. By way of example, in a light pipe in which the input surface 132 forms a semi-hemispherical cavity in which the light is coupled from the source 130 (e.g., a domed LED), the light pipe 130 can be selected to have a circular cross-sectional shape (i.e., one sidewall). Alternatively, for example, a flat input surface 132 may lend itself to a square and or rectangular cross-section to improve the mixing of light within the light pipe 130.

Moreover, each cross-section along the length of the light pipe can be of the same shape but have different dimensions. For example, in the depicted embodiment, the cross-sectional area of the light pipe 130 adjacent the proximal surface 132 can be smaller than the cross-sectional area of the light pipe 130 adjacent to the distal surface 136.

With specific reference to the exemplary embodiment depicted in FIGS. 1A-5B, for example, the light pipe includes four sidewalls of equal linear dimensions such that the light pipe 130 has a square cross-section along its entire length. Moreover, the dimensions of the proximal end 132 can be smaller than the dimensions of the distal end 136 such that the light pipe 130 is shaped as an inverted frustum. One of skilled in the art will appreciate based on the teachings herein, for example, that the relative divergence of one sidewall relative to the opposed sidewall, for example, can be varied so as to alter the output light distribution. By way of example, a light pipe 130 configured such that the sidewalls 134 diverge along the length of the light pipe from the proximal surface 132 to the distal surface 136 can have a smaller output beam angle (as characterized by full width at half maximum (FWHM) of the light intensity distribution in a plane perpendicular to the direction of propagation) than the output beam angle FWHM of a light pipe in which the sidewalls 134 converge towards the distal surface 136. A draft angle associated with the divergence of the opposed sidewalls can be, for example, in a range of about 0 degree to about 20 degrees.

As noted above, the lighting module 100 can additionally include a holder 120. The holder 120 can have a variety of configurations but generally defines a bore 122 in which the light pipe 130 can be disposed. In various embodiments, the bore 122 can have a cross-sectional area that is generally configured to match that of the light pipe 130. Accordingly, the light pipe 130 can be inserted into the holder 120 and can be retained therein, at least partially, for example, by way of a frictional fit between the holder 120 and the light pipe 130.

Figure 3:
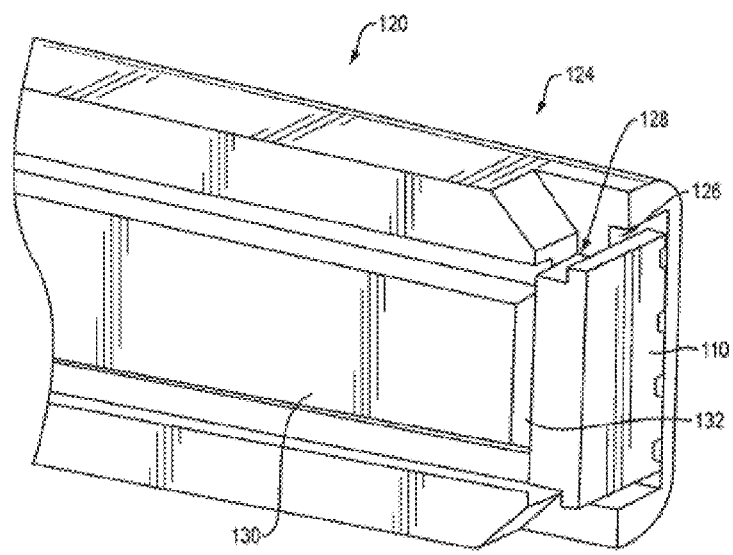
FIG. 3 depicts in detail a proximal end of the exemplary lighting module of FIG. 1A.

In various embodiments, the holder 120 can also be configured to seat the light source 110. With reference now to FIG. 3, the proximal end 124 of the holder 120 can contain a cavity in which the light source can be disposed. By way of example, the holder can include a shoulder 126 which can abut at least a portion of the light source 110. Moreover, the shoulder 126 can include one or more vents 128 that allows for the dissipation of heat from the light source 110.

Accordingly, as shown in FIG. 3, for example, a light source can be secured within the proximal end 124 of the holder 120 with the light pipe 130 disposed within the bore 122 of the holder 120. The holder 120 can thus be configured to align the input surface 132 of the light pipe 130 and the source 110 to efficiently couple light generated by the source 110 into the light pipe 130. Moreover, a gap (e.g., an air gap) between the light source 110 and the input surface 132 of the light pipe 130 can be in fluid communication with the vents 128 so as to prevent overheating of the source 110.

The holder 120 can additionally include one or more coupling mechanisms to enable the holder 120 to couple to adjacent lighting modules 100, as will be discussed in detail below. With reference now to FIG. 4, the holder 120 can include, for example, a distal flange 123 having a bore 125 formed therethrough. As will be appreciated by a person skilled in the art, the bore 125 can enable coupling between adjacent lighting module(s) 100. By way of non-limiting example, a pin can be inserted through the bores 125 of adjacent lighting modules to movably or fixedly couple the lighting modules 100. Moreover, the distal end of the holder 120 can be configured to retain the light pipe 120 within the bore. By way of example, the distal end of the holder can include one or more tabs 127 that can prevent the light pipe 120 from moving distally relative to the holder 130.

With reference again to FIG. 1A, the lighting module 100 can also be associated with a zoom lens 140 disposed distal to the output surface 136 of the light pipe 130 to receive light that is coupled out of the light pipe 130 and direct it towards a target surface. In various embodiments, the zoom lens 140 can be moved axially relative to the output surface 136 to alter the focusing power of the light being directed therethrough. By way of example, the zoom lens 140 can be translated along the central axis of the light pipe 130 so as to vary its distance from the output surface 136 of the light pipe 130, thereby varying the width (i.e. the convergence-divergence) of the output light distribution with respect to the central axis of the light pipe 130. In some embodiments, for example, the zoom lens 140 can be movable between a position near the output surface 136 to a distal position at the focal length of the output surface 136. In such an embodiment, axial movement of the lens toward the holder 120 (e.g., to the wide zoom position 140a) can be effective to increase the width of the beam distribution on the target surface whereas movement of the lens away from the holder 120 (e.g., to the narrow zoom position 140b) can decrease the width of the beam distribution on the target surface.

As will be appreciated by a person skilled in the art, the zoom lens 140 can be movable relative to the holder 120 using a variety of mechanisms. By way of example, the zoom lens 140 can be movable relative to the holder 120 and/or light pipe 130 via a step motor that can be controlled to position the zoom lens 140 at a desired location relative to the output surface 136 of the light pipe 130. As will be appreciated by a person skilled in the art, in lighting systems in which multiple lighting modules 100 are associated, a zoom lens 140 associated with each light pipe 130 can be moved individually relative to its respective holder 120 or in tandem with the other zoom lenses in the system. Alternatively, for example, the zoom lens 140 can be rotated within a housing in a first direction (e.g., clockwise) to move the zoom lens 140 away from the output surface 132 and in a second direction (e.g., counterclockwise) to move the zoom lens 140 toward the output surface 132.

As will be appreciated by a person skilled in the art, the zoom lens 140 can be shaped so as to provide a desired final output distribution on the target surface. As shown in FIG. 1A, for example, the zoom lens 140 can include an input surface 142, a lens body 144, and an output surface 146. The input surface 142 can be disposed in a facing relationship with the output surface 136 of the light pipe 130 and can be configured to couple the light received therefrom into the lens body 144, for example, via refraction as otherwise discussed herein. Light can traverse the lens body 144 and can exit through the output surface 146 of the zoom lens 140.

Figure 1C:
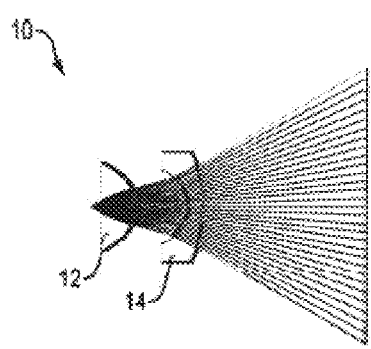
FIG. 1C schematically depicts the zoom lens system of FIG. 1B in a wide-beam position.
Figure 1D:
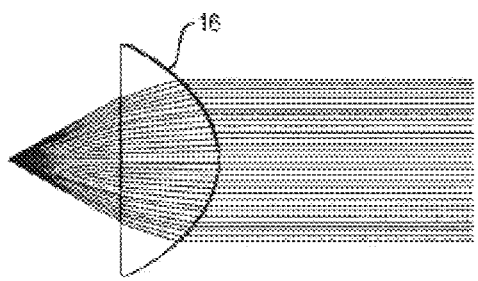
FIG. 1D schematically depicts a zoom lens comprising a single lens in an embodiment according to the teachings of the invention in a narrow-beam position.
Figure 1E:
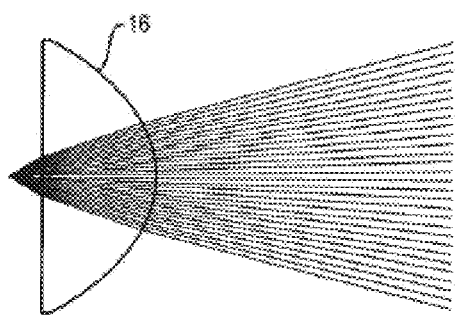
FIG. 1E schematically depicts the zoom lens of FIG. 1D is a wide-beam position.

In some embodiments, rather than utilizing a single lens, the zoom lens (herein also referred to as the zoom lens system) can include a plurality of lenses, at least one of which is axially movable relative to the output surface of the light pipe. For example, FIGS. 1B and 1C schematically depict a zoom lens system 10 (herein also referred to as a doublet zoom) that includes a lens 12 providing a positive optical power and a lens 14 providing a negative optical power. As least one of the lenses, and in some cases both, is axially movable relative to the output surface of the light pipe to change the angular spread of the output beam between a narrow-beam spread (shown in FIG. 1B) and a wide-beam spread (shown in FIG. 1C). For example, the angular spread of the output beam can be varied between about 5 degrees to about 80 degrees. The use of a doublet lens system with one positive lens and one negative lens can be advantageous in applications where a wide beam range, e.g., a divergence (FWHM) in a range of about 20 to about 80 degrees, is required. In embodiments in which the zoom lens includes a single positive lens (herein also referred to as a singlet zoom), in the "intrafocal position" (i.e., when the lens is placed close to the output surface of the light pipe), the positive power of the lens can reduce the divergence of the beam exiting through the output surface of the light pipe (See FIGS. 1D and 1E for schematic representation of a narrow-beam and wide-beam spread of the output beam in a system in which a singlet zoom 16 is employed). In contrast, the positive and the negative optical powers of the lenses of a doublet zoom allow achieving much wider beam spread, e.g., in a range of about 20 degrees to about 80 degrees (FWHM), when zoom system is in the "intrafocal position." Further, in many applications, a multiple-lens zoom lens system can provide other advantages, such as conventional advantages known in the art.

As will be appreciated by a person skilled in the art, the input surface 142 and output surface 146 of the zoom lens 140 can be configured to control the final output beam characteristics. By way of example, the output surface 146 can include surface features formed thereon that can provide additional control over the cross-sectional shape and/or the maximum divergence angle of the output beam and/or its "texture" on a target surface. For example, the output surface 146 can be configured to further mix the light such that the final output beam can have a cross-sectional shape that differs from the light received at the input surface 142. Although a beam of light emitted from a light pipe having a square cross-section can be similarly shaped (i.e., substantially square), the output surface 146 of the zoom lens 140 can be configured to mix the light, for example, so as to reduce the sharpness of the edges of the projected light pattern. By way of example, the output surface 146 of the zoom lens 140 can comprise surface features (e.g., annular rings, perturbations, microlenses) that are configured to modulate the output light distribution in a controlled manner.

Figure 5A:
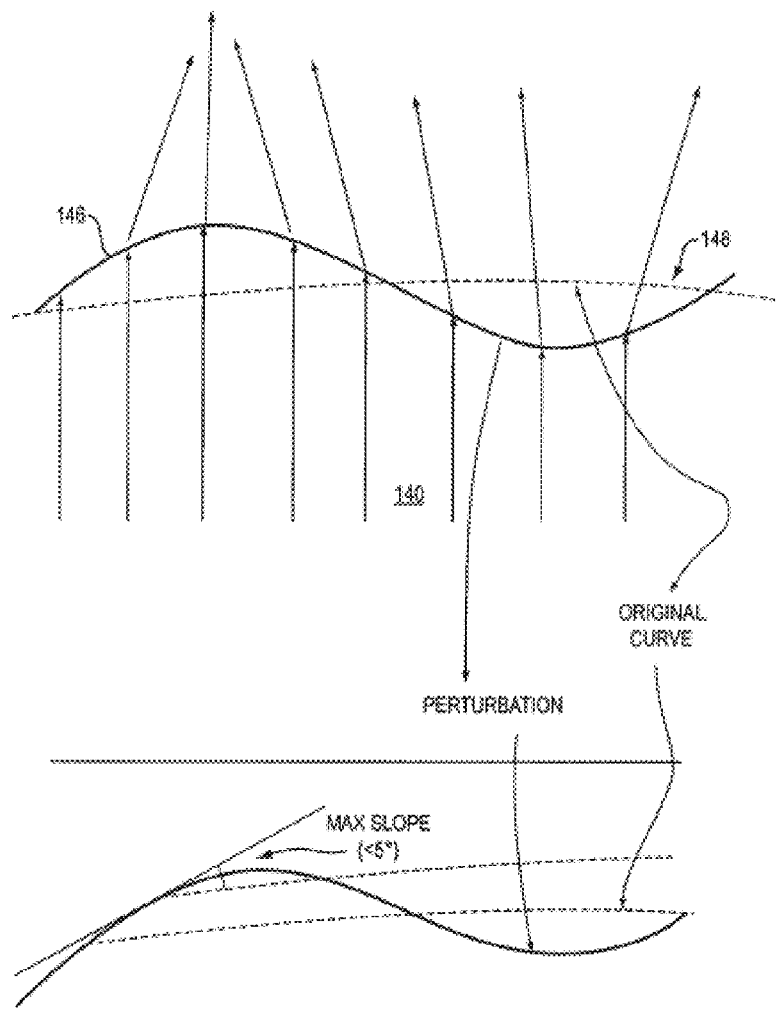
FIG. 5A schematically depicts an exemplary embodiment of the output surface of the zoom lens of FIG. 1A.

For example, with reference now to FIG. 5A, a pattern of sinusoidal grooves can be formed in the output surface 146 of the zoom lens 140. The sinusoidal grooves can have a variety of configurations. By way of example, the tangent of the sinusoidal grooves at one or more points along the surface can deviate less than about ±5 degrees relative to the tangent of a nominal surface 148 in which the grooves are formed at those points as depicted in FIG. 5A. In various embodiments, the sinusoidal grooves can be effective to scatter and/or modulate the light output from the light pipe 130 to decrease the sharpness of the edges of the output light distribution (e.g., reduce the appearance of a square output pattern on a target surface) and/or modulate the maximum divergence of the output light beam. By way of example, the sinusoidal grooves can reduce, or eliminate, high frequency components in a Fourier transform of the cross sectional intensity of the output light distribution. It should be understood that the controlled modulation of the output surface 146 can be achieved by employing patterns other than sinusoidal. Further, such controlled modulation can be implemented on either surface, or both surfaces, of the zoom lens. Yet, in other embodiments, rather than, or in addition to, imparting controlled modulation to one or more surfaces of the zoom lens, one or more additional optical elements (e.g., lenses) having at least a surface exhibiting such controlled modulation can be employed.

In some embodiments, the output surface 146 can be represented by a mathematical function as a combination of a base profile and a modulation profile. By way of illustration, the surface profile along a cross-sectional cut passing through the center of the surface (i.e., the intersection of an optical axis of the lens with the surface) along one dimension of the surface (herein denoted as the x-dimension) can be defined as follows:

$$F(x)=f(x)+P(x) \qquad \text{Eq. (1),}$$

wherein,

F(x) denotes the surface profile along the cross-sectional cut, f(x) denotes a base profile, and P(x) denotes a modulation profile.

P(x) is selected to be a function having a continuous first derivative. In other words, the first derivative of P(x), herein denoted as $$\frac{dP(x)}{dx}$$

or P'(x), exhibits no discontinuity. Further, f(x) can be selected to exhibit a continuous first derivative.

A rotation of the above cross-sectional profile about an optical axis of the surface would generate a two-dimensional rotationally symmetric surface profile. In other embodiments, the surface profile may not be rotationally symmetric. For example, the cross-sectional profiles along two orthogonal dimensions (e.g., x and y dimensions) can be different. By way of example, in the above example, the surface profile along a cross-sectional cut passing the center of the surface along an orthogonal dimension (the y-dimension) can be characterized by a different base profile and/or modulation profile.

A variety of functions can be employed for the base and the modulation profiles defined above in Equation (1). By way of example, the surface can be rotationally symmetric with a semi-circular base profile and a sinusoidal modulation profile along one dimension of the surface (which corresponds in two dimensions to a hemispherical base profile and an undulating surface having sinusoidal variations along each direction along the surface). For example, the surface profile along one dimension (herein the x-dimension) can be defined as follows:

$$F(x) = \sqrt{R^2 - x^2} + \alpha \sin(\beta \cdot x) \qquad \text{Eq. (2)}$$

wherein R is a constant corresponding to the radius of the base profile), $\alpha$ is a constant corresponding to an amplitude of the sinusoidal modulations, and $\beta$ denotes the frequency of the sinusoidal modulations. The cross-sectional profile defined by the above Equation (2) can be rotated about an optical axis of the surface to generate a two-dimensional surface characterized by a hemispherical base profile on which a plurality of sinusoidal modulations are disposed. The amplitude and the frequency of the sinusoidal modulations can be selected based on a desired modulation of the output beam. For example, for a given amplitude of the modulations, increasing the modulation frequency can increase the divergence angle of the beam, e.g., as characterized by full width at half maximum (FWHM) of the light intensity distribution in a plane perpendicular to the direction of propagation. Further, changing the amplitude of the modulations while keeping the frequency of modulations constant can also result in a change in the divergence angle of the output beam. In some cases, the amplitude and the modulation frequency can be both changed so as to keep the divergence angle of the beam constant while changing another characteristic of the beam, e.g., its cross-sectional shape or its texture on a target surface.

Figure 5B:
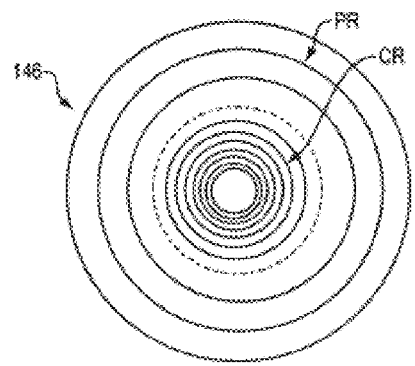
FIG. 5B is a schematic top view of the output surface of a zoom lens according to an embodiment in which a central portion of the surface exhibits one type of surface modulation and a peripheral portion of the output surface exhibits a different type of surface modulation.

In some embodiments, one type of surface modulation is employed over one portion of the output surface 146 of the zoom lens 140 and another type of surface modulation is employed over another portion of the surface of the lens 140. In this manner, the spread of the light exiting through the system via one portion of the output surface of the zoom lens 140 can be different than the spread of the light exiting the system via another portion of that output surface. By way of example, FIG. 5B shows a top view of an embodiment of the output surface 146 of the zoom lens 140 in which sinusoidal surface modulations with one frequency are present in a central region (CR) of the lens output surface 146 and sinusoidal surface modulations with a different frequency (e.g., a lower frequency) are present in a peripheral region (PR) of the lens output surface. In this embodiment, the portion of the light leaving the lens through the central portion of the lens can show a maximum angular divergence that is different, e.g., greater, than a maximum angular divergence exhibited by the light rays exiting the lens through the peripheral region of the surface.

In some embodiments, the frequency of the surface modulations can vary continuously from the center of the output surface 146 of the zoom lens 140 to an outer boundary of that output surface. Further, while in many embodiments discussed herein, the surface modulations are disposed on the output surface of the zoom lens, in some other embodiments, the surface modulations can be disposed on the inner surface of the zoom lens or both the inner and outer surfaces.

Figure 6A:
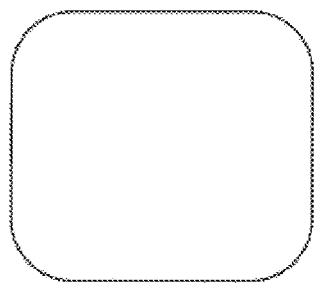
FIG. 6A schematically depicts an exemplary shape of an output surface of a light pipe utilized in an embodiment of an optical system according to the teachings of the invention, FIG. 6B schematically depicts another exemplary shape of an output surface of a light pipe utilized in an embodiment of an optical system according to the teachings of the invention.
Figure 6B:
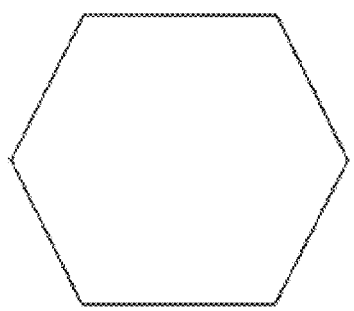

As noted above, in some embodiments, the output surface of the light pipe, e.g., the output surface 136 depicted in FIG. 1A, can be shaped so as to impart a desired cross-sectional shape to the light exiting the light pipe. By way of example, FIG. 6A schematically depicts an output surface of the light pipe, which is shaped generally as a square with rounded corners. The rounded corners ensure that the emitted light output, though generally square shaped, lacks sharp corners. As another example, FIG. 6B schematically depicts another embodiment of an output surface of the light pipe, which has a hexagonal shape. In some implementations of this embodiment, the light pipe can have a square cross-section while its output surface has a hexagonal shape. Yet, in another embodiment, the output surface of the light pipe can have an octagonal shape. In some implementations of such an embodiment, the light pipe can have a square or hexagonal cross-sectional shape while its output surface has an octagonal shape. The octagonal shape of the output surface of the light pipe can impart a similar shape to the cross-sectional profile of the light beam exiting the light pipe. The octagonal shape of the light beam can be further adjusted via modulations of the output surface of the zoom lens to provide an output beam that has an approximately round cross-sectional shape.

In some embodiments, a light interface unit is employed to facilitate coupling of the light emitted by one or more light sources, e.g., one or more LEDs, into the light pipe. By way of example, the light interface unit can include an input surface that conforms to an output surface of a lighting unit in which the light sources are disposed, e.g., a hemispherical dome cover of an LED unit, to facilitate the delivery of the light emitted by the light sources to the light pipe. In some embodiments, the light interface unit can be formed integrally with the remainder of the light pipe, e.g., it can form a proximal portion of the light pipe. In some embodiments, the light interface unit can not only facilitate the coupling of the light emitted by the source into the light pipe, but it can also provide some mixing of the light.

Figure 7:
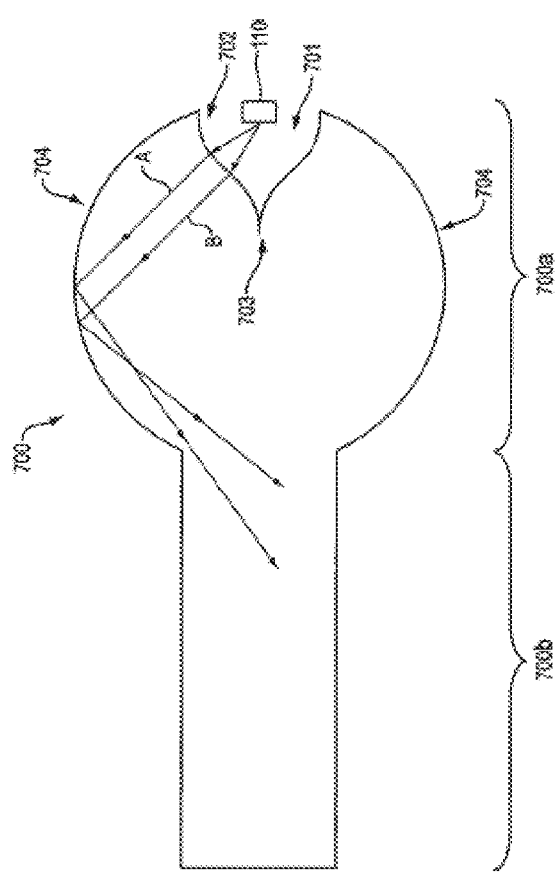
FIG. 7 schematically depicts a light pipe according to an embodiment of the invention having a light interface unit at a proximal end thereof.

By way of example, FIG. 7 schematically depicts a light pipe 700 according to such an embodiment, which includes a proximal portion 700a that functions as a light interface unit for receiving light from a light source 110 and delivering the light to the remainder of the light pipe 700b. The light interface unit 700a further provides some mixing of the light rays (see, e.g., exemplary light rays A and B) prior to their delivery to the remainder of the light pipe. In this embodiment, the light interface unit includes a cavity 701 formed by a curved input surface 702 that terminates in an apex 703. The input surface 702 receives the light from the light source 110 and couples the light into the light interface unit 700. The input surface 702 is configured such that a substantial portion of the light incident thereon (e.g., at least about 80%, or at least about 90%, or 100%) is refracted to be redirected toward a peripheral surface 704. In this embodiment, the peripheral surface is configured in a manner known in the art to cause total internal reflection of the light rays incident thereon, or at least the total internal reflection of a substantial portion of the incident light rays (e.g., at least about 80% or 90% of the incident light rays), so as to redirect those rays toward the remainder portion 700b of the light pipe 700. In some other embodiments, the peripheral surface can be metallized to cause specular reflection of the light rays incident thereon. Although in this embodiment, the light interface unit is formed integrally with the remainder of the light pipe, in other embodiments, it can be a stand-alone unit that is optically coupled to the light pipe. In such cases, the light interface unit and the light pipe can be coupled to one another, e.g., by using an adhesive or seating the light interface unit and the light pipe in a holder in optical alignment relative to one another. By way of further illustration, the light interface unit 700a can be formed similar to the lenses disclosed in U.S. Published Application No. 2010/0226127 entitled "Light Mixing Optics and System," which is herein incorporated by reference in its entirety.

As another example, FIG. 8 schematically depicts a light pipe 800 that includes a concave light receiving surface 801, which provides a cavity in which a light source 802, herein an LED having a convex dome 802a, can be seated. In this embodiment, the concave light receiving surface 802 conforms substantially to the convex surface of the LED dome. The matching of these surfaces can advantageously allow efficient coupling of the light emitted by the LEDs into the light interface unit.

In some embodiments, different portions of the light pipe can exhibit different cross-sectional shapes. For example, a portion of the light pipe can have a circular cross-section while another portion of the light pipe can have a square or a hexagonal cross-section. By way of example, the different cross-sectional shapes can be utilized to modulate, e.g., enhance, coupling of the light into and out the light pipe while ensuring effective mixing the light as it propagates along the length of the light pipe. By way of illustration, FIG. 9 schematically depicts a light pipe 900 having a proximal portion 900a that exhibits a circular cross-section, an intermediate portion 900b that exhibits a hexagonal cross-section, and a distal portion 900c that exhibits a square cross-section. The light is coupled into the light pipe via an input surface 901 of the proximal portion and is coupled out of the light pipe via an output surface 902 of the distal portion 900c. In this embodiment, the portions 900a, 900b, and 900c are formed as an integral unit. In other embodiments, these portions can be formed as separate units and then assembled in a manner known in the art. Further, the ordering of the cross-sectional shapes can be different than those depicted in FIG. 9. For example, in some embodiments, the distal portion 900c can have a circular cross-section to impart a circular shape to the cross-section of the light beam exiting the light pipe.

Figure 10A:
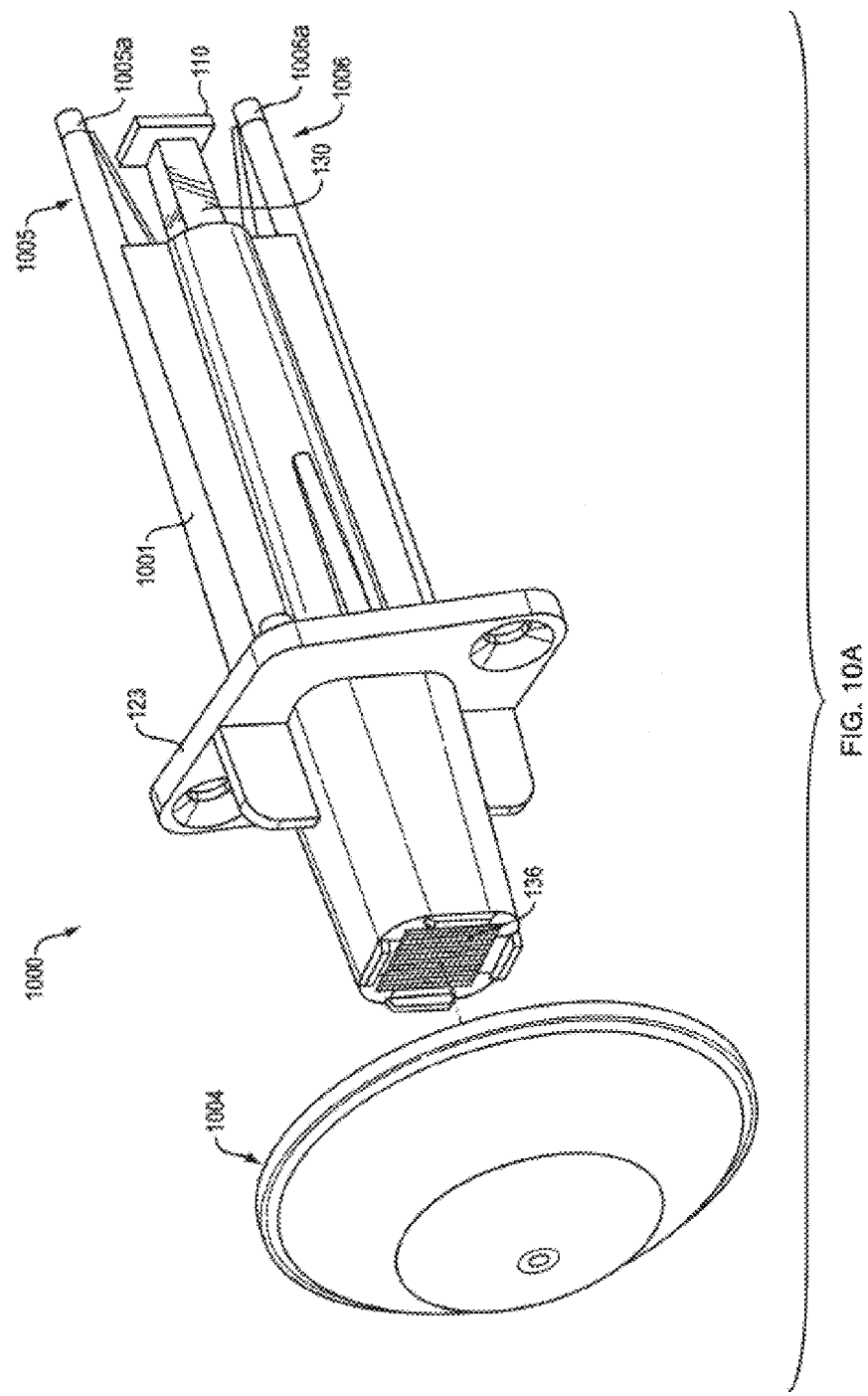
FIG. 10A schematically depicts an optical system according to an embodiment of the invention having a holder with two legs for coupling to a printed circuit board (PCB) on which a light source, e.g., an LED, is mounted.
Figure 10B:
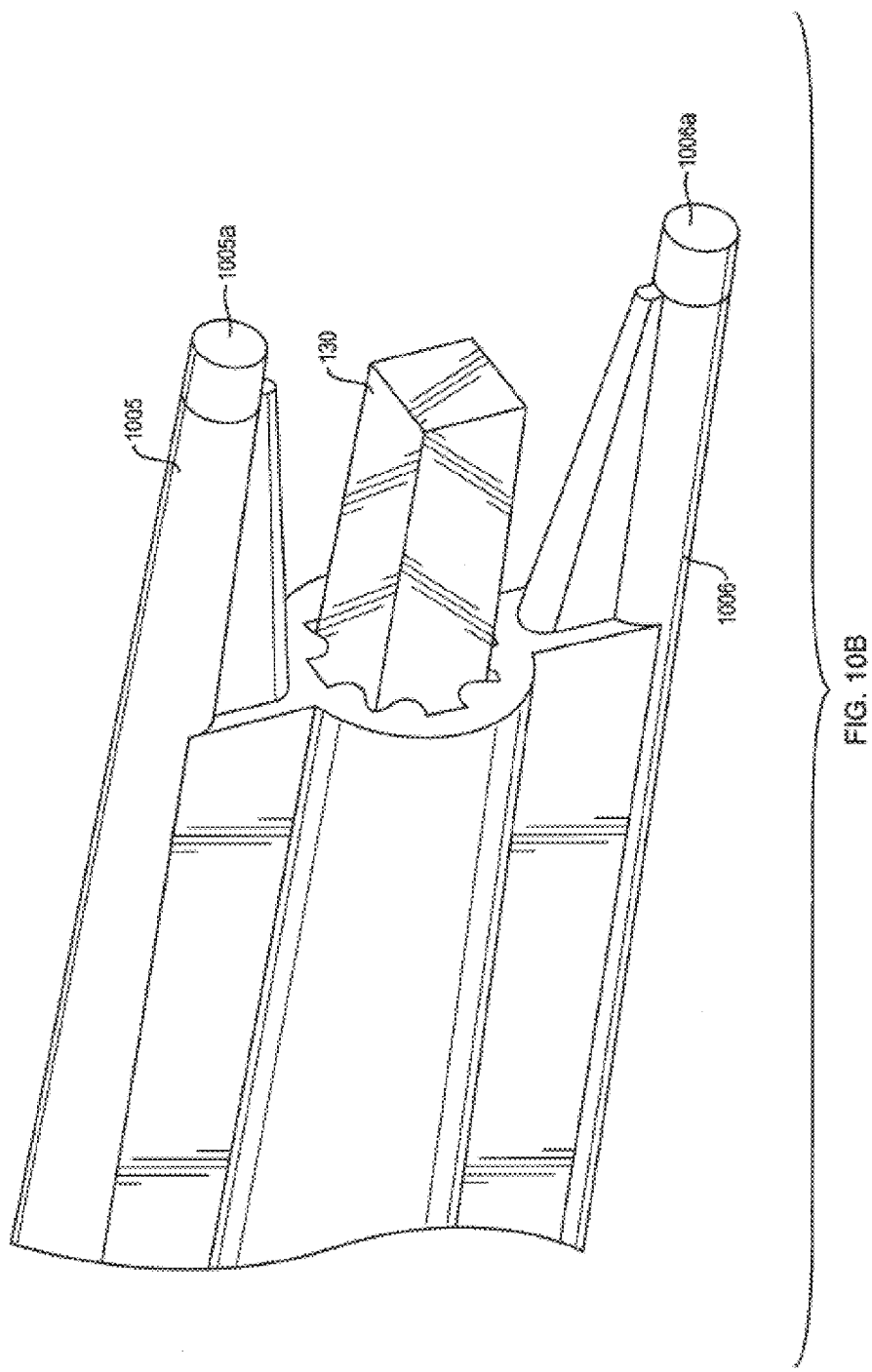
FIG. 10B is a partial schematic view of the optical system of FIG. 10A depicting the two legs of the holder.

In some embodiments, a holder employed in a system according to the teachings of the invention in which the light pipe is seated can include a plurality of legs for coupling to a plurality of openings in a printed circuit board (PCB) on which a light source, e.g., an LED, is mounted. By way of example, FIGS. 10A and 10B show schematically an optical system 1000 according to an embodiment of the invention that includes a holder 1001 in which the light pipe 130 is seated. The light pipe 130 is optically coupled to a light source 110 for receiving light therefrom. Similar to the previous embodiments, the optical system 1000 further includes a zoom lens 1004 that receives light from an output surface of the light pipe and projects the received light onto a target surface. The holder includes two legs 1005 and 1006 at its proximal end. The legs 1005 and 1006 include, respectively, tips 1005a and 1006a that are configured for insertion into openings 1100a and 1100b of a PCB 1100, shown schematically in FIG. 10C. The legs advantageously allow optical alignment of the light pipe 130 seated in the holder with the light source 110, e.g., an LED, disposed on the PCB 1100.

Figure 11B:
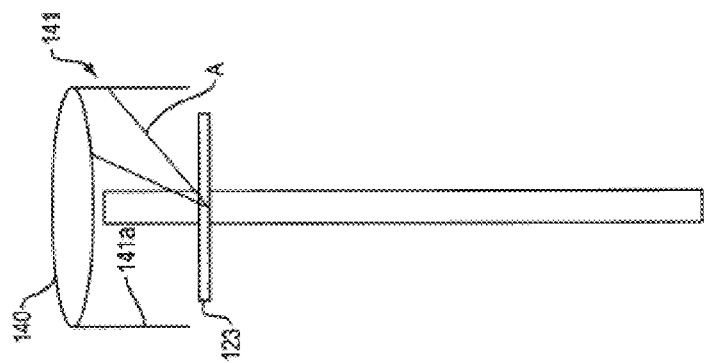
FIG. 11B is a schematic view of the optical system of FIG. 11A in which the zoom lens is positioned at a proximal location relative to the output surface of the light pipe.
Figure 11A:
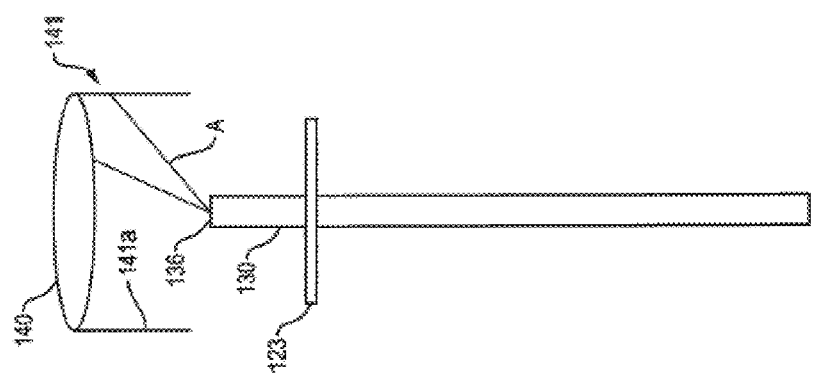
FIG. 11A is a partial schematic view of an optical system according to an embodiment of the invention which includes a zoom lens coupled to a baffle with the zoom lens positioned at a distal location relative to an output surface of the light pipe.

In some embodiments, the zoom lens in a system according to the invention can include a baffle for preventing certain light rays exiting the output surface of the light pipe, e.g., those light rays that miss the zoom lens, from reaching the external environment. For example, FIGS. 11A and 11B are partial schematic views of an embodiment according to the teachings of the invention in which the zoom lens 140 includes a baffle 141. As shown in FIG. 11A, when the zoom lens is moved away from the output surface 136 of the light pipe 130 to be at the distal location, some of the light rays, e.g., the exemplary light ray A, that leave the output surface of the light pipe at relatively large divergence angles, are not incident on the lens, i.e., they miss the lens. The baffle captures these light rays and prevents them from reaching the external environment. In some embodiments, an inner surface 141a of the baffle is black and/or is covered with light absorbing material to absorb the light rays incident thereon, or at least a substantial portion of those light rays. As shown in FIGS. 11A and 11B, as well as FIG. 10A, distal flange 123 of the holder 1001 is offset relative to the output surface 136 of the light pipe 130 (it is set back from the output surface) so as not to interfere with the baffle 141 as the zoom lens is moved closer to the output surface, e.g., when the zoom lens is positioned at its proximal location. Such offset of the flange can also be useful in certain embodiments in which the zoom lens includes a concave surface facing the output surface of the light pipe, rather than a convex surface shown in the above embodiments, in that it can provide room for the peripheral portions of the lens as the lens is moved closer to the light pipe.

With reference now to FIG. 12, an exemplary lighting system 600 in accord with various aspects of applicants' teachings is schematically depicted. As shown in FIG. 12, the lighting system 600 can comprise multiple lighting modules 100a-c, as generally described above with reference to FIGS. 1A-5B, and can be arranged such that their individual output light distributions substantially overlap on the target surface. In various embodiments, the lighting module 100a-c can contain a different light source generating light of a different wavelength such that the lighting system 600 can be effective to mix different colored light in the combined output light distribution.

In some exemplary embodiments, each of the lighting modules 100a-c can be rotated slightly on its axis relative to one or more of the other lighting modules 100a-c. In embodiments in which the light pipes 130 have a non-circular cross-section, rotation of one or more of the lighting modules 100a-c can be effective to change the total output light distribution on the target surface, and reduce, for example, the final appearance of the output light distribution having a shape corresponding to that of the cross-section of the light pipe.

By way of example, in some implementations, the lighting system 600 can include 30 light modules with the light pipes and/or the light sources (e.g., the LEDs) of the modules rotated about their longitudinal axes to varying degrees relative to one another. For example, in some cases each of the LEDs can be progressively rotated by 30 degrees (i.e., thirty positions from 0 degree to 357 degrees).

Any of the lenses and or light pipes described above can be made of polymethyl methacrylate (PMMA), PMMI, glass, polycarbonate, cyclic olefin copolymer and cyclic olefin polymer, or any other suitable material. By way of example, the zoom lens can be formed by injection molding, by mechanically cutting a reflector or lens from a block of source material and/or polishing it, by forming a sheet of metal over a spinning mandrel, by pressing a sheet of metal between tooling die representing the final surface geometry including any local facet detail, and so on. Reflective surfaces can be created by a vacuum metallization process which deposits a reflective metallic (e.g., aluminum) coating, by using highly reflective metal substrates via spinning or forming processes. Faceting on reflective surfaces can be created by injection molding, by mechanically cutting a reflector or lens from a block of source material and/or polishing it, by pressing a sheet of metal between tooling die representing the final surface geometry including any local facet detail, and so on.

In some embodiments, the light pipe can be formed of silicone, which can provide thermal resistance to the heat generated by the light source. In some such embodiments, the light pipe made of silicone is seated within a holder such that the holder ensures that the light pipe would retain its shape even as its temperature rises due to heat generated by the light source. In some such embodiments, the peripheral surface of the light pipe is metallized and/or an inner surface of a holder in which the light pipe is seated is metallized to provide specular reflection of the light incident on the peripheral surface of the light pipe.

Figure 13A:
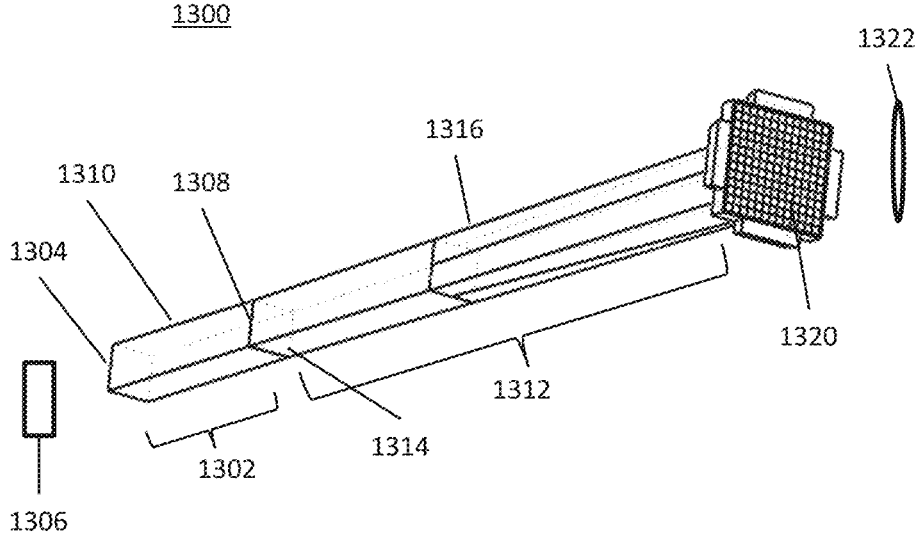
FIG. 13A schematically depicts an optical system according to an embodiment having a glass light pipe optically coupled to a light pipe formed of a polymeric material.
Figure 13B:
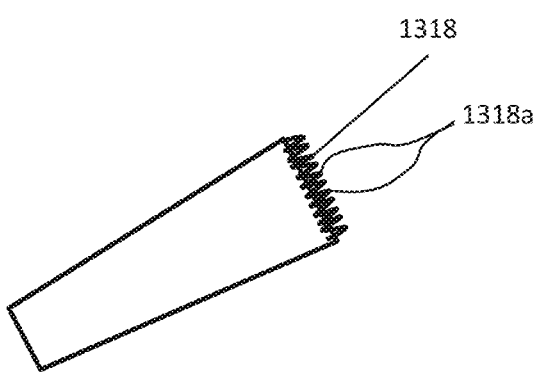
FIG. 13B is a schematic cross-sectional view of the polymeric light pipe used in the optical device of FIG. 13A having a textured output surface.
Figure 13C:
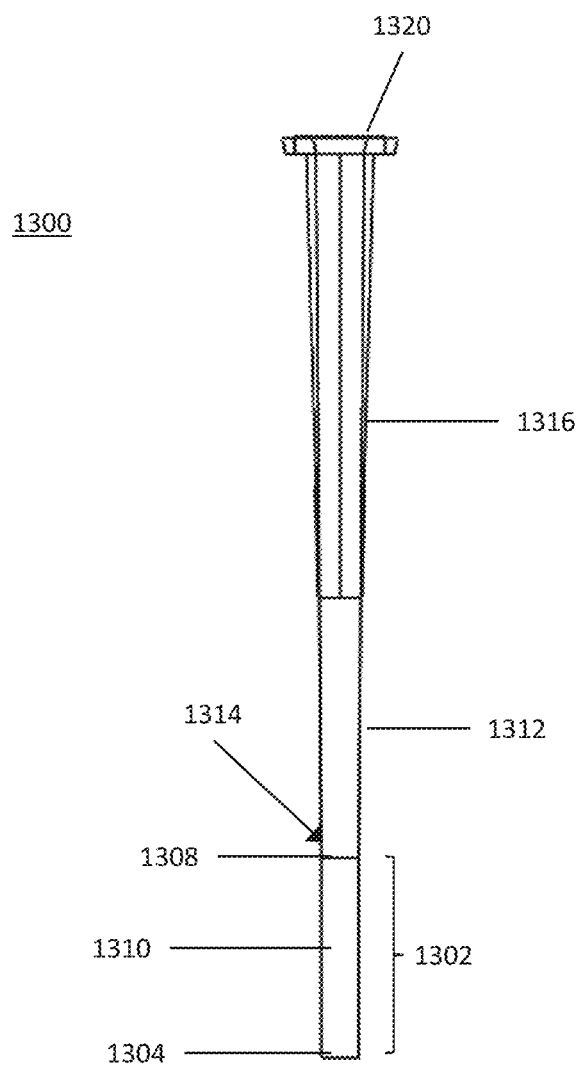
FIG. 13C is a schematic cross-sectional view of the optical system depicted in FIG. 13A.

In some embodiments, the light pipe can be formed fully or at least partially of glass. The use of glass light pipe can be advantageous in a number of lighting applications, and especially in those in which high power LEDs are employed, as glass has a high heat tolerance. By way of example, FIGS. 13A-C schematically depict an optical system 1300 according to such an embodiment, which includes a glass light pipe 1302 having an input surface 1304 (herein referred to also as proximal surface) for receiving light from at least one light source 1306 and an output surface 1308 (herein also referred to as distal surface) through which the received light exits the light pipe. In this embodiment, the input surface 1304 is flat and can be tightly coupled (e.g., via contact) to a flat LED emitting surface. Similar to the previous embodiments, a portion of the light entering the light pipe propagates directly from the input surface 1304 to the output surface 1308, and at least a portion of the light coupled into the light pipe via the input surface 1304 reaches the output surface 1308 via one or more reflections by the sidewall(s) 1310 of the light pipe. The sidewall(s) 1310 can be adapted to reflect light incident thereon via a variety of different mechanisms, such as total internal reflection or specular reflection.

In this embodiment, the glass light pipe 1302 has a substantially uniform cross-section along its length. In this embodiment, the light pipe 1302 has a square cross-sectional profile, though other polygonal cross-sectional profiles (e.g., hexagonal or octagonal cross-sections) can also be employed. In other embodiments, the light pipe 1302 can be tapered along its length such that the surface area of the input surface is smaller than the surface area of the output surface. In some embodiments, the length of the glass light pipe can be in a range of about 5 mm to about 30 mm, e.g., 15 mm or 20 mm, though other lengths can also be employed.

With continued reference to FIG. 13A, in this embodiment, the glass light pipe 1302 is optically coupled at its distal end to another light pipe 1312 formed of PMMA (polymethyl methacrylate). In this embodiment, the light pipe 1312 is glued to the glass light pipe such that its input surface 1314 is optically coupled to the output surface of the glass light pipe 1302 to receive light exiting that output surface. In this embodiment, the cross-sectional shape and the surface area of the input surface of the light pipe 1312 matches those of the output surface of the light pipe 1302. At least a portion of the light entering the light pipe 1312 passes therethrough without any reflections at its sidewall(s) 1316 to reach its output surface 1318 (not visible in this figure, but shown schematically in FIG. 13B) and another portion of the light entering the light pipe 1312 undergoes one or more reflections at its sidewall(s) 1316 to reach its output surface.

A plurality of microlenses 1320 are optically coupled to the output surface 1318 of the light pipe 1312. The microlenses can provide additional mixing of the light exiting the light pipe 1312. In some embodiments, the microlenses can be formed as a separate structure and coupled to the light pipe 1312, and in other embodiments, they can be formed as surface features of the output surface. The microlenses 1320 can have a variety of shapes and/or sizes. For example, each microlens 1320 can be dimensioned such that it is at least about 10 times smaller than the surface area of the output surface 1318. The microlenses 1320 can have, e.g., a height of about 1 mm or less (e.g., in a range of about 0.05 mm to about 1 mm).

In this embodiment, the output surface 1318 of the light pipe 1312 is textured. In other words, the output surface 1318 exhibits a plurality of undulations 1318*a* (which can be, e.g., randomly distributed). In this embodiment, such texturing of the output surface can be characterized by a maximum height (i.e., the distance between the lowest point and the highest point) in a range of about 0.01 mm (millimeters) and 0.25 mm (e.g., about 0.05 mm to about 0.1 mm). In some embodiments, the highest points of the textured surface are separated laterally by a distance in a range of about 0.1 mm to about 0.2 mm. In some embodiments, the surface texturing is characterized by a depth of 0.0004 inches and 1 degree minimum draft. The texturing of the output surface of the light pipe can be achieved by a plurality of different mechanisms, such as chemical etching or electro-erosion.

Figure 13D:
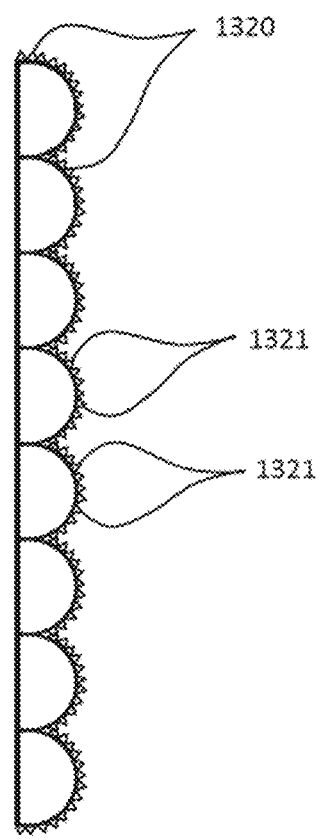
FIG. 13D schematically depicts a plurality of microlenses disposed at an output surface of a light pipe, where the microlenses include textured output surfaces, FIG. 14A schematically depicts an optical system according to an embodiment having a single glass light pipe.

With reference to FIG. 13D, in some embodiments, the output surfaces of the microlenses 1320 can include surface textures 1321. The surface textures 1321 can have attributes similar to those discussed above in connection with surface textures 1318*a*. For example, the texturing of the output surfaces of the microlenses can be characterized by a maximum height in a range of about 0.01 mm to about 0.25 mm (e.g., in a range of about 0.05 mm to about 0.1 mm).

Applicants have discovered that the combination of the texturing and the microlenses is particularly advantageous as it enhances color mixing and further allows better focusing of the light exiting the light pipe 1312 by one or more projection lenses as the textured surface effectively provides a plurality of emitting light points emanating from the output surface, as discussed in more detail below. It should be understood that the combination of the surface texturing and microlenses discussed in connection with this embodiment can also be employed in connection with the previous embodiments, such as the embodiment discussed above in connection with FIG. 1A.

The light pipe 1312 is tapered, e.g., in a manner discussed above in connection with the other embodiments. More specifically, in this embodiment, the surface area of the output surface of the light pipe 1312 is greater than the surface area of its input surface (e.g., at least 10 times greater).

Referring again to FIG. 13A, similar to the previous embodiments, a projection lens 1322 is optically coupled to the output surface of the 1318 of the light pipe 1312 to receive at least a portion of the light exiting that output surface. The lens 1322 can be a zoom lens that can move axially relative to an output surface 1318 of the light pipe 1312 to change, e.g., the angular spread of the beam. In some embodiments, rather than utilizing a single zoom lens, a zoom lens system comprising two or more lenses, at least one of which is axially movable relative to the output surface of the light pipe, is employed to change the divergence of the output beam, e.g., between a narrow-beam spread and a wide-beam spread. For example, the zoom lens system can include a lens providing a positive optical power and another providing a negative optical power. In some embodiments, a multi-lens zoom system can provide, in the wide-beam position, an output beam exhibiting a divergence (e.g., as characterized by full width at half maximum (FWHM) of the light intensity distribution in a plane perpendicular to the direction of propagation) in a range of about 20 degrees to about 80 degrees. In some embodiments, in the narrow-beam position, the output beam can have a divergence (e.g., as characterized by FWHM) equal to or less than about 15 degrees, or less than about 10 degrees, or less than about 5 degrees.

Similar to the previous embodiments, the light source 1306 and light pipes 1302, 1310 as well as the projection lens 1322 can be disposed in a suitable holder, such as that discussed above.

Figure 14A:
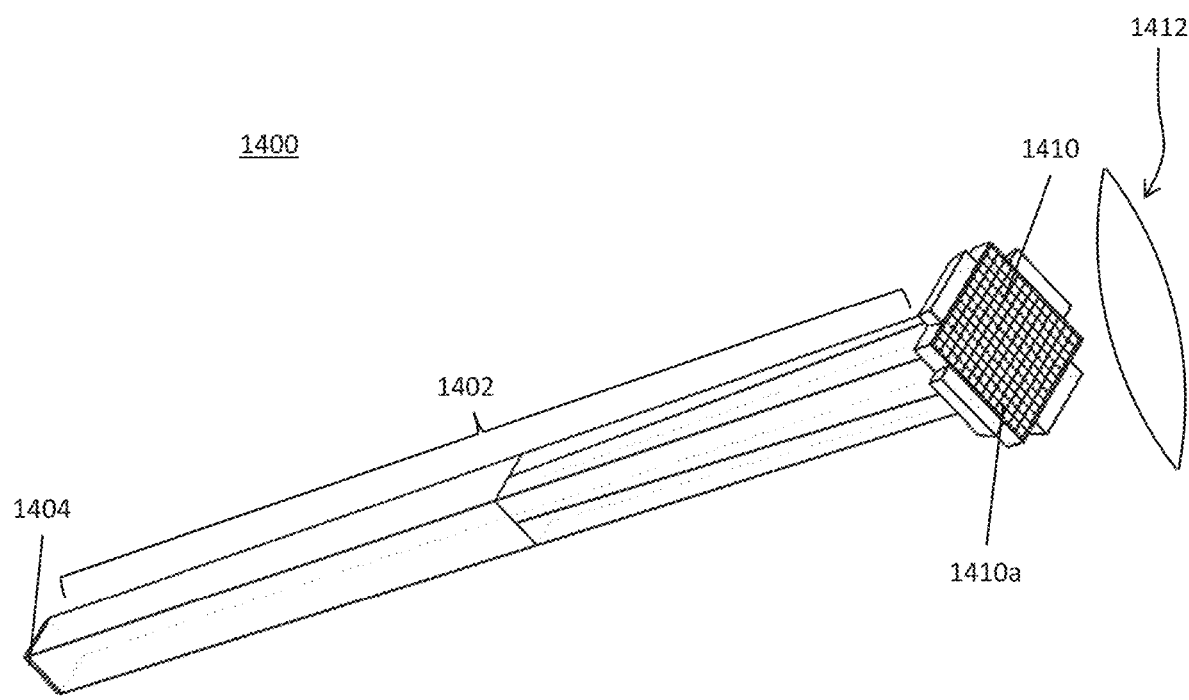
FIG. 14B is a schematic side cross-sectional view of the optical system depicted in FIG. 14A.
FIG. 14C schematically depicts a light-shaping element according to an embodiment of the invention having an output surface comprising a plurality of textured microlenses, FIG. 14D schematically depicts a light-shaping element according to an embodiment of the invention having a textured input surface and an output surface comprising a plurality of microlenses, FIG. 15A schematically depicts a glass light pipe having a textured output surface that is optically coupled to a projection lens, FIG. 15B schematically depicts a glass light pipe having a plurality of textured microlenses disposed at its output surface and optically coupled to a projection lens, and FIG. 15C schematically depicts a glass light pipe optically coupled to a light-shaping element.
Figure 14B:
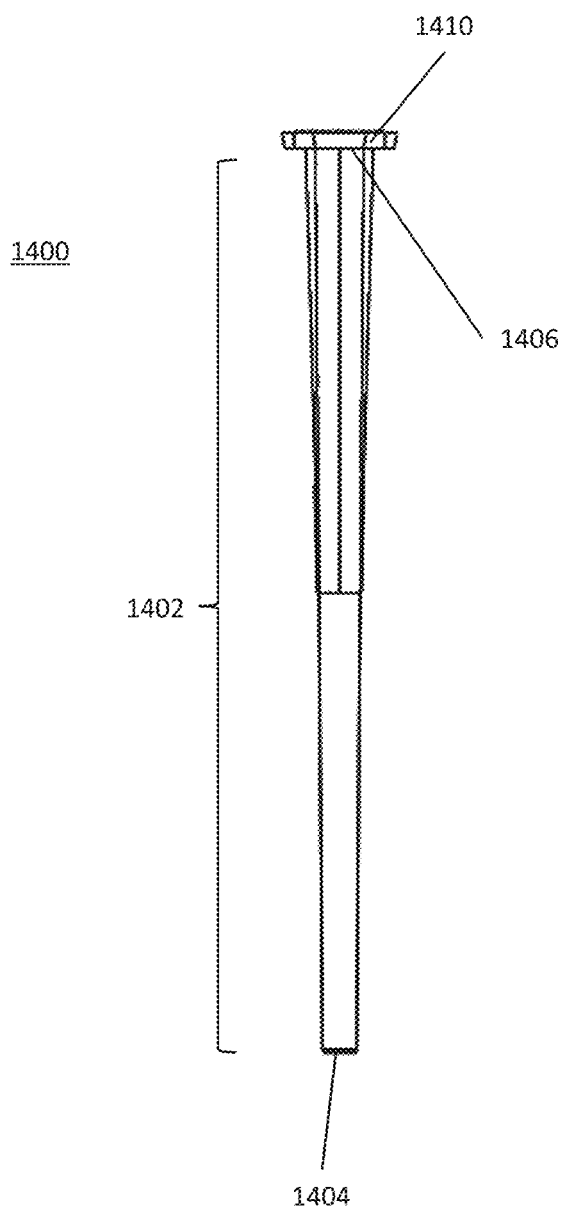

FIGS. 14A-B schematically depict an optical system 1400 in accordance with another embodiment of the present teachings, which includes a single light pipe 1402 formed of glass having an input surface 1404 for receiving light from a light source (not shown) and an output surface 1406 through which light exits the light pipe. The glass light pipe 1402 is tapered such that the surface area of its output surface 1406 is greater than the surface area of its input surface 1404, e.g., the area surface of the output surface can be at least 10 times that of the input surface. In other embodiments, the glass rod can have a uniform cross-section along its length. In this embodiment, the glass light pipe 1402 has a proximal portion with a square cross-sectional profile and a distal portion with an octagonal cross sectional profile, though other profiles can also be employed. By way of example, in some other embodiments, the glass light pipe 1402 can have a single rectangular, a hexagonal, or an octagonal cross-section.

The output surface 1406 is coupled to a polymeric structure 1410 (herein also referred to as a light-shaping element) having an input surface (not visible in this figure) and a plurality of microlenses 1410*a* formed on its output surface The light exiting the light pipe and through the microlenses can be received by a projection lens 1412, similar to the projection lenses discussed above. By way of example, the projection lens can focus the light onto a target surface. The polymeric structure can be formed of any suitable polymeric material. Some examples of such polymeric materials include, without limitation, polycarbonate, polymethyl methacrylate (PMMA), polymethacrylmethylimid (PMMI), cyclic olefin copolymer, cyclic olefin polymer, and silicone. In some embodiments, the polymeric structure 1410 can be formed of a polymeric material exhibiting a high heat resistance, such as silicone. In some embodiments, the microlenses 1410*a* can have a semi-spherical shape with a diameter equal to or less than about 1 mm (e.g., in a range of about 0.05 mm to about 1 mm). In some embodiments, the polymeric light-shaping element 1410 can have a thickness in a range of about 0.5 to about 3 mm.

The polymeric light-shaping element 1410 can be coupled to the light pipe 1402 using a variety of different mechanisms. By way of example, the polymeric structure 1410 can be coupled to the light pipe 1402 via a glue, a bracket, or any other suitable mechanism.

Figure 14C:
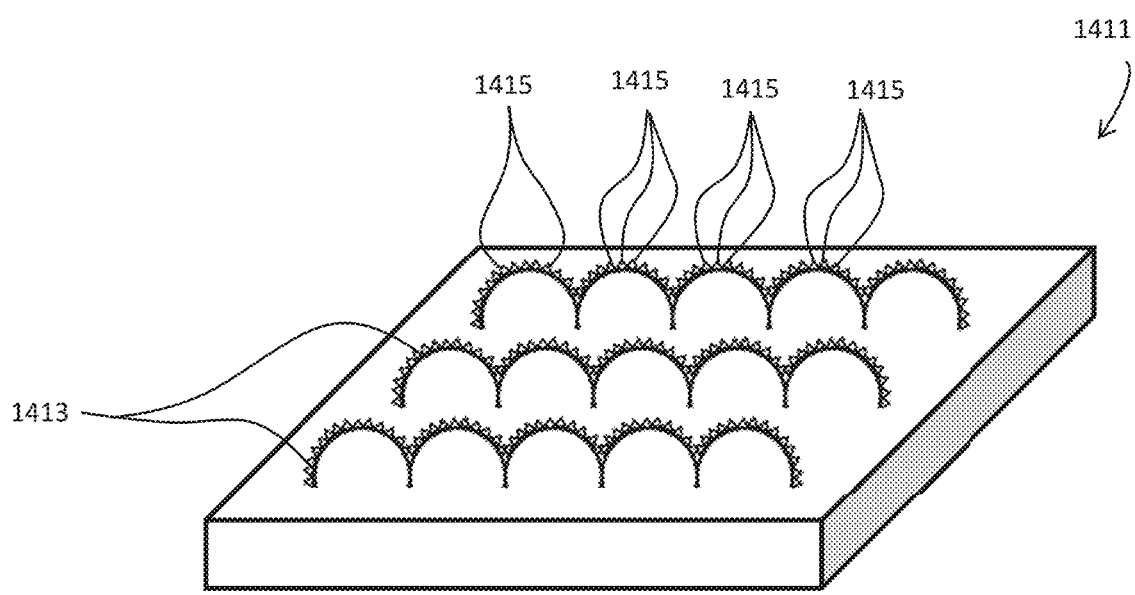

In some embodiments, the surfaces of one or more of the microlenses 1410*a* of the polymeric structure are textured. By way of example, FIG. 14C schematically depicts a polymeric structure 1411 that includes a plurality of microlenses 1413, such as the microlenses discussed above in connection with the polymeric structure 1410. In this embodiment, the outer surfaces of the microlenses include surface texturing 1415 in the form of surface undulations having heights in the range of about 0.01 mm to about 0.25 mm, e.g., in a range of about 0.05 mm to about 0.1 mm.

Figure 14D:
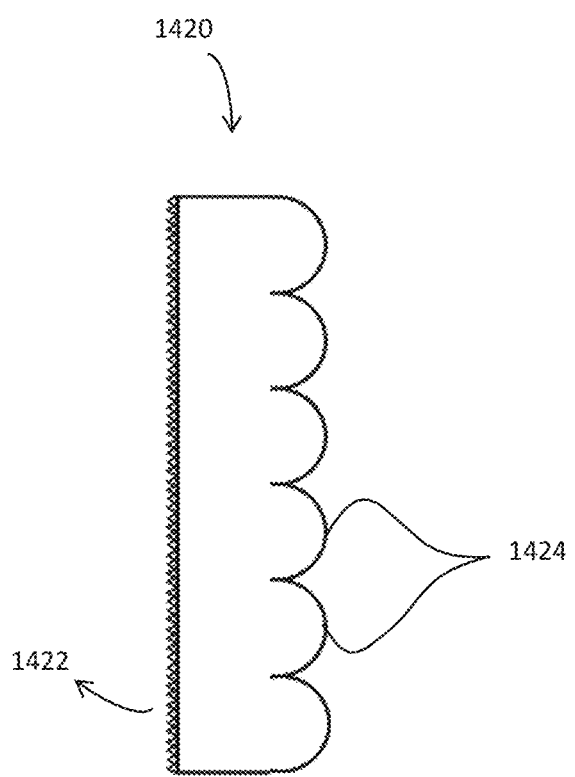

With reference to FIG. 14D, in some embodiments, a polymeric light-shaping element 1420 is provided that includes a textured input surface 1422 and a plurality of microlenses 1424 through which the light exits the light-shaping element.

Figure 15A:
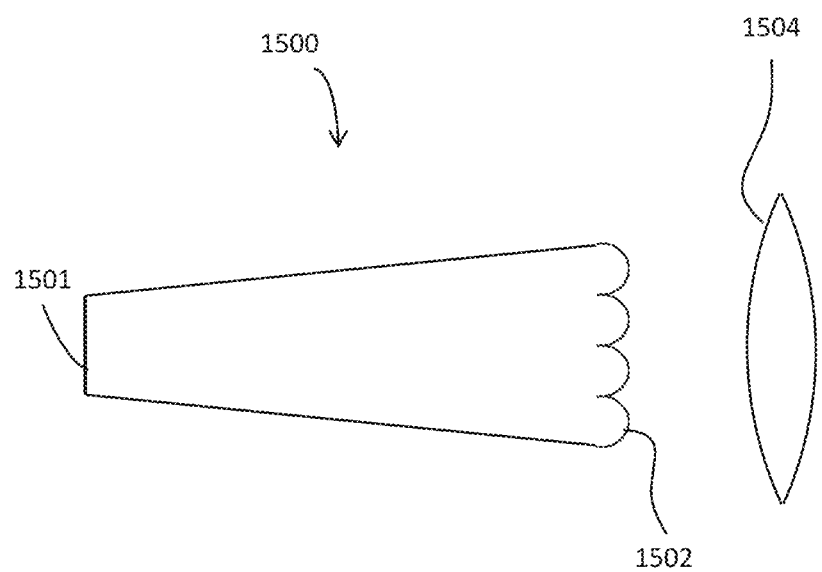

With reference to FIG. 15A, in some embodiments of an optical system a light pipe 1500 entirely formed of glass is used, where the light pipe includes an input surface 1501 for receiving light from one or more light sources (e.g., LEDs) and an output surface 1502 through which the light can exit the light pipe. Although in this embodiment, the light pipe 1500 has a square cross-section, in other embodiments it can have another polygonal cross-section, such as a rectangular, a hexagonal or an octagonal cross-section. In this embodiment, the output surface 1502 includes a plurality of microlenses. The microlenses can be formed integrally with the light pipe. Alternatively, the microlenses can be formed as a separate unit and coupled to the output surface of the light pipe. Similar to the previous embodiments, in some implementations, the microlenses can have hemispherical shapes with a diameter (in a horizontal cross section) equal to or less than about 1 mm, e.g., in a range of about 0.05 mm to about 1 mm.

Figure 15B:
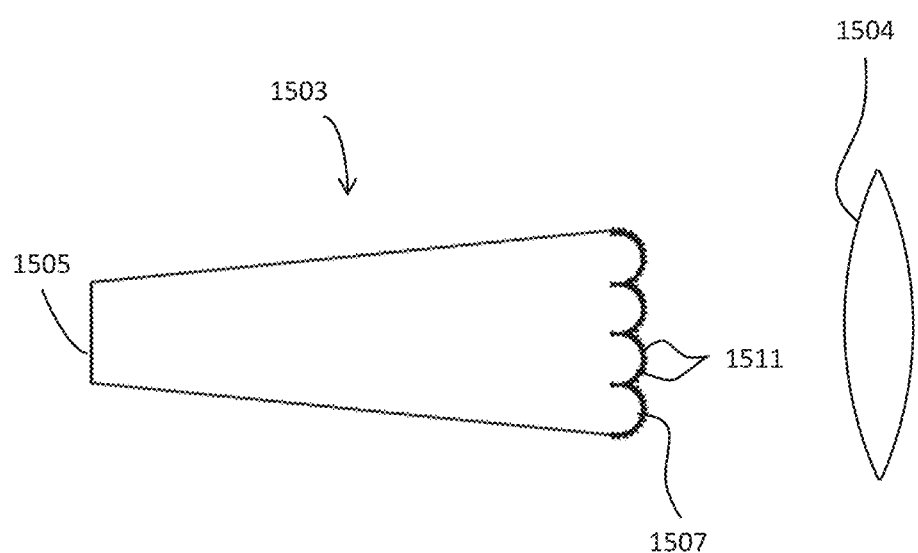

In some embodiments, the output surfaces of the microlenses can be textured to exhibit surface undulations. By way of example, FIG. 15B exhibits a glass light pipe 1503 that includes an input surface 1505 for receiving light from one or more light sources (e.g., LEDs) (not shown) and an output surface 1507 through which the light exits the light pipe. While in this implementation the light pipe 1503 has a square cross-section, in other implementations the light pipe can exhibit a different polygonal cross-section. Similar to the previous embodiment, the output surface of the light pipe includes a plurality of microlenses, e.g., having a hemispherical shape with a diameter (in a horizontal cross section) in a range of about 0.05 mm to about 1 mm. Further, a plurality of surface features 1511 in the form of surface undulations cover the output surfaces of the microlenses. In some implementations, the texturing features 1511 exhibit heights (e.g., peak-to-trough distance) in a range of about 0.01 mm to about 0.25 mm, e.g., in a range of about 0.05 mm to about 0.1 mm. Similar to the previous embodiments, a projection lens 1504 can receive the light exiting the textured microlenses and project that light onto a target surface.

Figure 15C:
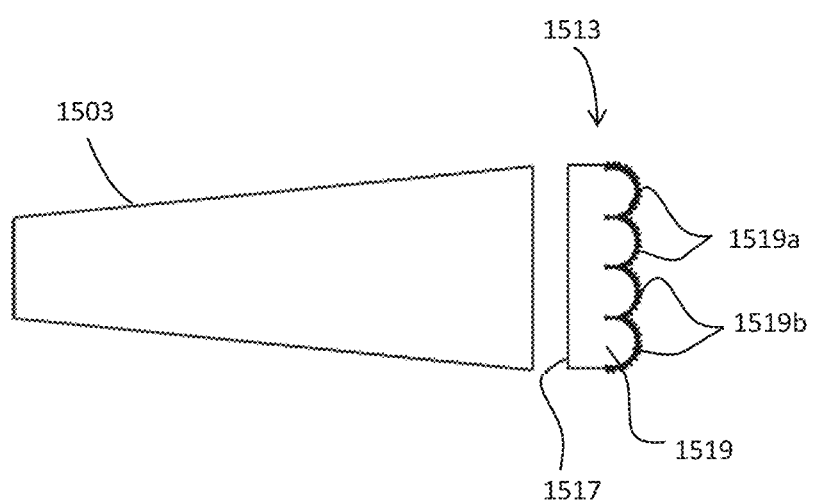

With reference to FIG. 15C, in some embodiments, the glass light pipe 1503 is optically coupled to a separate light-shaping element 1513 that includes an input surface 1517 for receiving light from the light pipe and an output surface 1519 through which the light exits the light-shaping element. In this embodiment, the output surface 1519 of the light-shaping element includes a plurality of microlenses 1519*a* that include textures 1519*b* on their curved surfaces. In some embodiments, the light-shaping element can be formed of a polymeric material, such as those discussed above. The microlenses can have a diameter (in a horizontal cross section) in a range of about 0.5 mm to about 1 mm, and the surface textures can have a height in a range of about 0.01 mm to about 0.25 mm, e.g., in a range of about 0.05 mm to about 0.1 mm.

Any appended claims are incorporated by reference herein and are considered to represent part of the disclosure and detailed description of this patent application. Moreover, it should be understood that the features illustrated or described in connection with any exemplary embodiment may be combined with the features of any other embodi-

What is claimed is:

1. An optical system, comprising
   a glass light pipe extending from an input surface for receiving light from a light source to an output surface through which the light exits the light pipe, said light pipe having a polygonal cross-sectional profile,
   a light-shaping element having an input surface that is optically coupled to said output surface of the glass light pipe so as to receive at least a portion of the light exiting the glass light pipe and an output surface through which the light exits the light-shaping element, wherein said input surface of the light-shaping element comprises a textured surface, and
   a polymeric projection lens optically coupled to the output surface of the light-shaping element to receive light therefrom.

2. The optical system of claim 1, wherein said textured surface comprises a plurality of microlenses each of which provides a curved surface through which the light exits the microlens.

3. The optical system of claim 1, wherein said textured surface comprises a plurality of protrusions having a height in a range of about 0.01 mm to about 0.25 mm.

4. The optical system of claim 1, wherein said light-shaping element has a thickness in a range of about 0.5 mm to about 3 mm.

5. The optical system of claim 1, wherein said glass light pipe is tapered such that said input surface thereof has a smaller surface area than that of its output surface.

6. The optical system of claim 5, wherein said glass light pipe has a draft angle equal to or less than about 20 degrees.

7. The optical system of claim 1, wherein said light source comprise at least one light emitting diode (LED).

8. The optical system of claim 1, wherein said light source comprises a plurality of light sources providing light of different colors.

9. The optical system of claim 1, wherein said polygonal cross-sectional profile comprises any of a square, a rectangular, a hexagonal or an octagonal profile.

10. The optical system of claim 1, wherein said glass light pipe comprises at least two portions with different cross-sectional profiles.

* * * * *